(12) United States Patent
Miller et al.

(10) Patent No.: US 7,206,022 B2
(45) Date of Patent: Apr. 17, 2007

(54) CAMERA SYSTEM WITH EYE MONITORING

(75) Inventors: Michael E. Miller, Rochester, NY (US); Cathleen D. Cerosaletti, Rochester, NY (US); Elena A. Fedorovskaya, Pittsford, NY (US); Edward Covannon, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 684 days.

(21) Appl. No.: 10/303,978

(22) Filed: Nov. 25, 2002

(65) Prior Publication Data

US 2004/0100567 A1    May 27, 2004

(51) Int. Cl.
  *H04N 5/222* (2006.01)
  *H04N 5/76* (2006.01)
  *H04N 9/47* (2006.01)
  *H04N 5/225* (2006.01)

(52) U.S. Cl. .......................... 348/333.03; 348/333.11; 348/231.3; 348/64; 348/376

(58) Field of Classification Search ............ 348/78, 348/46, 107, 333.03
   See application file for complete search history.

(56) References Cited

U.S. PATENT DOCUMENTS

| | | | | |
|---|---|---|---|---|
| 3,724,932 A | * | 4/1973 | Cornsweet et al. ......... 351/210 |
| 4,828,381 A | * | 5/1989 | Shindo ...................... 351/211 |
| 5,036,347 A | * | 7/1991 | Tsunekawa et al. ........... 396/51 |
| 5,164,831 A | * | 11/1992 | Kuchta et al. .............. 348/231.7 |
| 5,214,466 A | * | 5/1993 | Nagano et al. ............... 396/51 |
| 5,225,862 A | * | 7/1993 | Nagano et al. ............... 396/51 |
| 5,253,008 A | * | 10/1993 | Konishi et al. .............. 396/51 |
| 5,477,264 A | | 12/1995 | Sarbadhikari et al. |
| 5,486,892 A | * | 1/1996 | Suzuki et al. ................. 396/51 |
| 5,541,655 A | * | 7/1996 | Kaneda ................... 348/333.03 |
| 5,570,156 A | * | 10/1996 | Arai et al. .................... 396/51 |
| 5,579,079 A | * | 11/1996 | Yamada et al. ............... 396/51 |
| 5,594,500 A | * | 1/1997 | Tanaka et al. .............. 348/345 |
| 5,606,390 A | * | 2/1997 | Arai et al. .................... 396/51 |
| 5,666,215 A | | 9/1997 | Fredlund et al. |

(Continued)

FOREIGN PATENT DOCUMENTS

EP    0 680 723 A    11/1995

(Continued)

OTHER PUBLICATIONS

"Looking at Pictures: Affective facial, visceral, and behavioral reactions", by Peter J. Lang et al., Psychophysiology, 30 (1993) 261-273.

(Continued)

*Primary Examiner*—Ngoc-Yen Vu
*Assistant Examiner*—Richard M. Bemben
(74) *Attorney, Agent, or Firm*—Roland R. Schindler

(57) ABSTRACT

In one aspect of the invention a camera system is provided having an image capture system adapted to capture an image of a scene during an image capture sequence and an eye monitoring system adapted to determine eye information including a direction of the gaze of an eye of a user of the camera system. A controller is adapted to store the determined eye information including information characterizing eye gaze direction during the image capture sequence and to associate the stored eye information with the scene image.

35 Claims, 13 Drawing Sheets

U.S. PATENT DOCUMENTS

| | | | |
|---|---|---|---|
| 5,678,066 A * | 10/1997 | Sato | 396/51 |
| 5,734,425 A | 3/1998 | Takizawa et al. | |
| 5,742,233 A | 4/1998 | Hoffman et al. | |
| 5,748,992 A | 5/1998 | Tsukahara et al. | |
| 5,760,917 A | 6/1998 | Sheridan | |
| 5,761,543 A * | 6/1998 | Yamada et al. | 396/51 |
| 5,857,121 A * | 1/1999 | Arai et al. | 396/51 |
| 5,911,687 A | 6/1999 | Sato et al. | |
| 5,912,705 A * | 6/1999 | Saruwatari | 348/333.03 |
| 5,990,954 A * | 11/1999 | Kobayashi et al. | 348/333.03 |
| 6,003,991 A | 12/1999 | Viirre | |
| 6,004,061 A | 12/1999 | Manico et al. | |
| 6,018,630 A * | 1/2000 | Arai et al. | 396/51 |
| 6,035,054 A * | 3/2000 | Odaka et al. | 382/117 |
| 6,094,222 A * | 7/2000 | Tanaka et al. | 348/346 |
| 6,137,534 A * | 10/2000 | Anderson | 348/222.1 |
| 6,191,819 B1 * | 2/2001 | Nakano | 348/333.03 |
| 6,246,437 B1 * | 6/2001 | Kaneda | 348/333.03 |
| 6,278,489 B1 * | 8/2001 | Hirasawa | 348/348 |
| 6,282,231 B1 | 8/2001 | Norman et al. | |
| 6,282,317 B1 | 8/2001 | Luo et al. | |
| 6,287,252 B1 | 9/2001 | Lugo | |
| 6,294,993 B1 | 9/2001 | Calaman | |
| 6,307,589 B1 * | 10/2001 | Maquire, Jr. | 348/333.03 |
| 6,438,323 B1 | 8/2002 | DeCecca et al. | |
| 6,470,264 B2 * | 10/2002 | Bide | 701/207 |
| 6,505,003 B1 * | 1/2003 | Malloy Desormeaux | 396/429 |
| 6,522,360 B1 * | 2/2003 | Miyawaki et al. | 348/347 |
| 6,608,615 B1 | 8/2003 | Martins | |
| 6,657,673 B2 * | 12/2003 | Ishikawa | 348/376 |
| 6,930,707 B2 * | 8/2005 | Bates et al. | 348/78 |
| 2001/0015761 A1 * | 8/2001 | Yasuda | 348/333.01 |
| 2002/0019584 A1 | 2/2002 | Schulze et al. | |
| 2002/0076100 A1 | 6/2002 | Luo | |
| 2002/0101619 A1 | 8/2002 | Tsubaki et al. | |
| 2003/0122942 A1 * | 7/2003 | Parker et al. | 348/231.3 |
| 2003/0142041 A1 | 7/2003 | Barlow et al. | |
| 2003/0210255 A1 | 11/2003 | Hiraki | |

FOREIGN PATENT DOCUMENTS

| | | |
|---|---|---|
| EP | 0 467 094 | 3/1998 |
| EP | WO 01/26021 | 4/2001 |
| EP | WO 01/7136 | 9/2001 |
| EP | WO 02/27640 | 4/2002 |
| EP | 1 220 530 | 7/2002 |
| WO | WO 02/080568 | 10/2002 |

OTHER PUBLICATIONS

"FotoFile: A Consumer Multimedia Organization and Retrieval System", by Allan Kuchinsky et al.

"Facial ExpressionRecognition using a Dynamic Model and Motion Energy", by Irfan Essa et al. MIT Media Laboratory Perceptual Computing Section Technical Report No. 307, pp. 1-8.

Digital Still Camera Image File Format Standard, Version 2.1, Jul. 1998, Japan Electronic Industry Development Association.

CompactFlash Specification Revision 1.4, CompactFlash Association, Jul. 1999.

U.S. Appl. No. 09/549,356, entitled "Customizing A Digital Camera" by Prabu et al. filed Apr. 14, 2000.

Alejandro Jaimes et al., "Using Human Observers' Eye Movements in Automatic Image Classifiers", Proceedings of 2001 SPIE, vol. 4299, Jan. 22, 2001, pp. 373-384.

Angela Chang et al., "LumiTouch: An Emotional Communication Device", lumitouch@media.mit.edu.

Olivier Liechti et al., "A Digital Photography Framework Enabling Affective Awareness in Home Communication".

Rebecca Hansson et al., "The LoveBomb: Encouraging the Communication of Emotions in Public Spaces", Interactive Institute, Sweden, www.playresearch.com.

Jennifer Healey et al., "StartleCam: A Cybernetic Wearable Camera", Oct. 1998, pp. 1-8, 2nd International Symposium on Wearable Computers 1998.

Don Lake, "How a Cybernetic Camera Triggered by the Subconscious Could Tackle Image Overload", Nov. 2000, pp. 21-23.

Jennifer Healey, "Wearable and Automotive Systems for Affect Recognition from Physiology", May 2000, pp. 1-3, Massachusetts Institute of Technology.

Applied Science Laboratories, "Technology and Systems for Eye Tracking: Model H6", www.a-s-l.com.

* cited by examiner

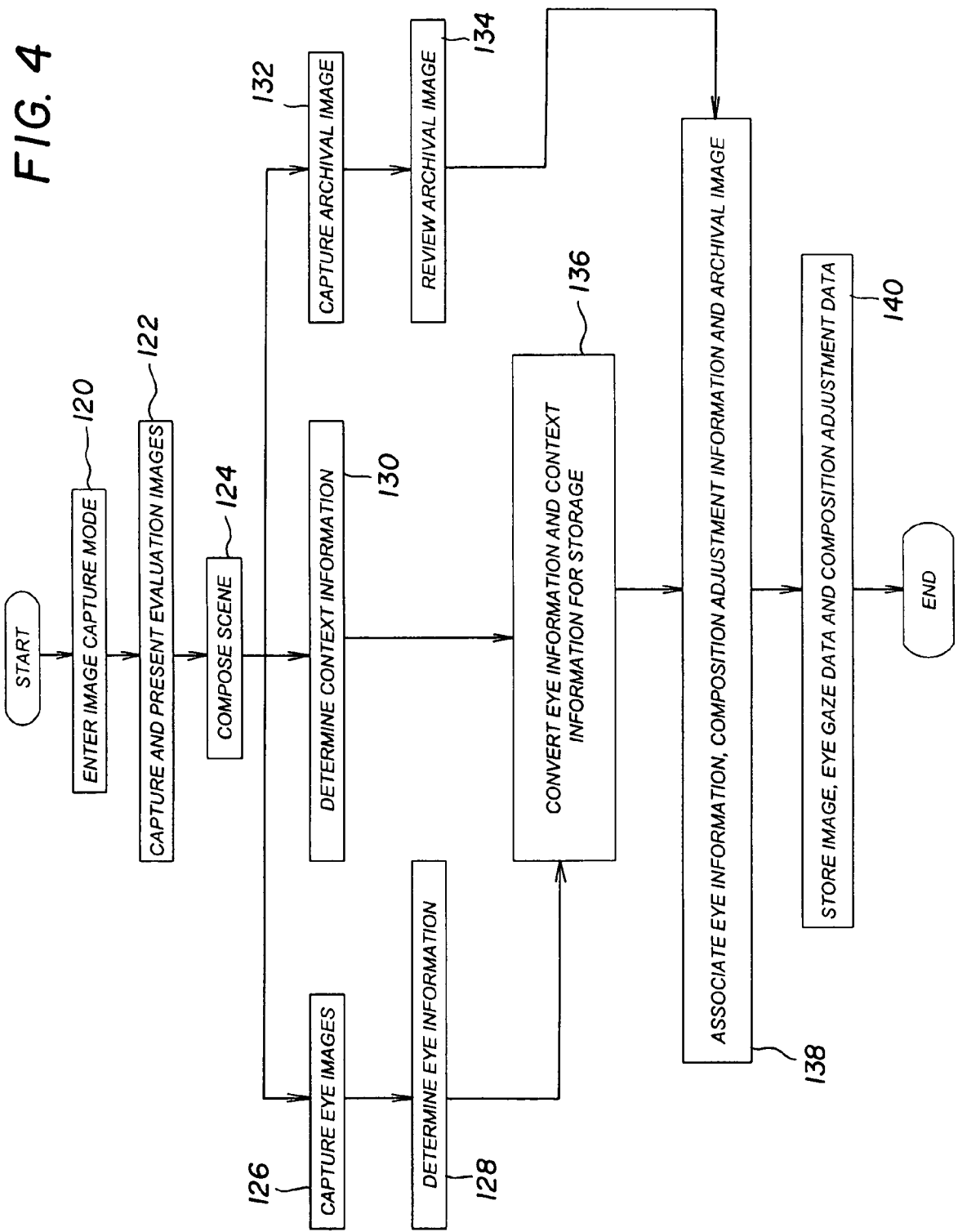

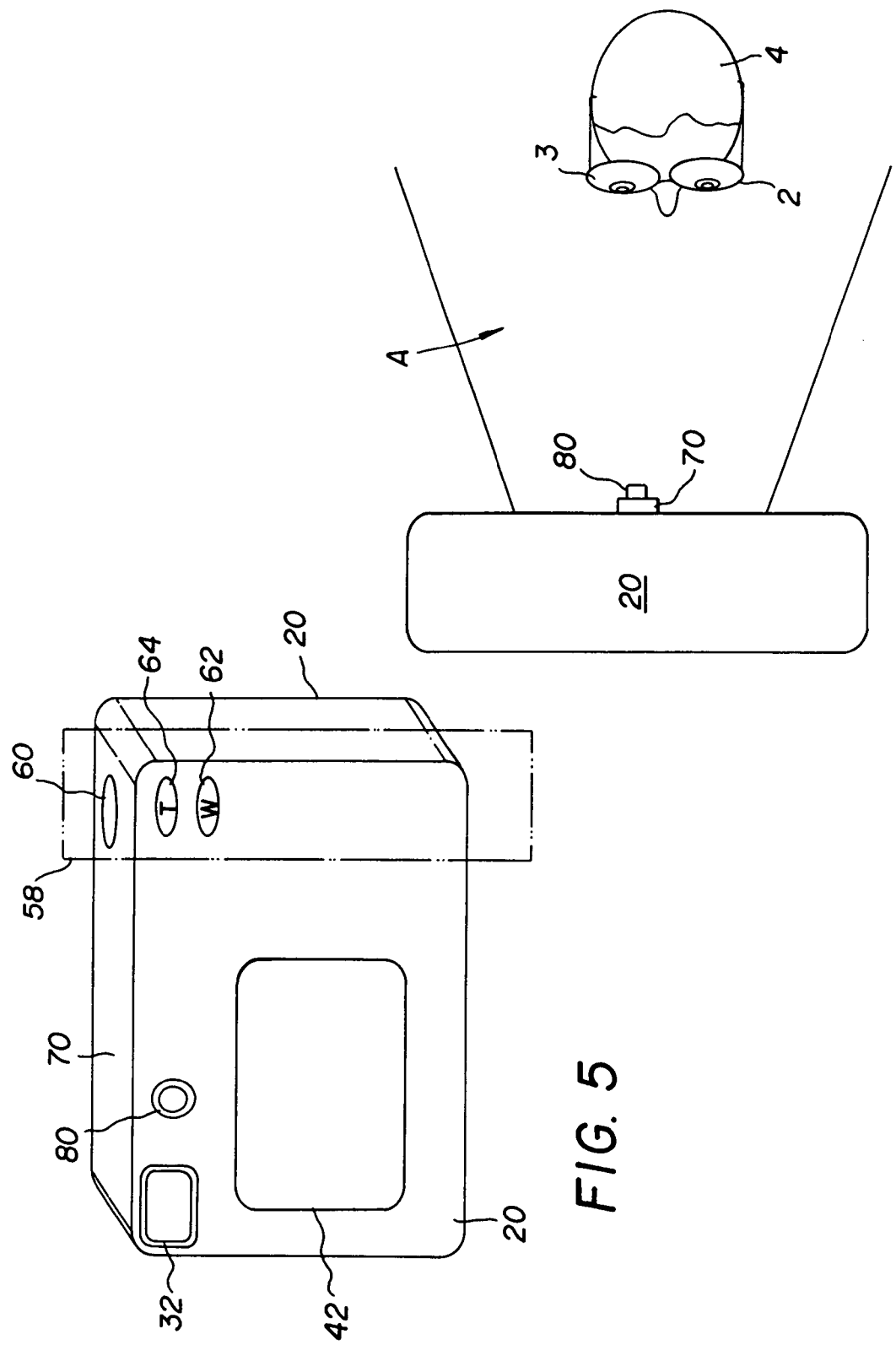

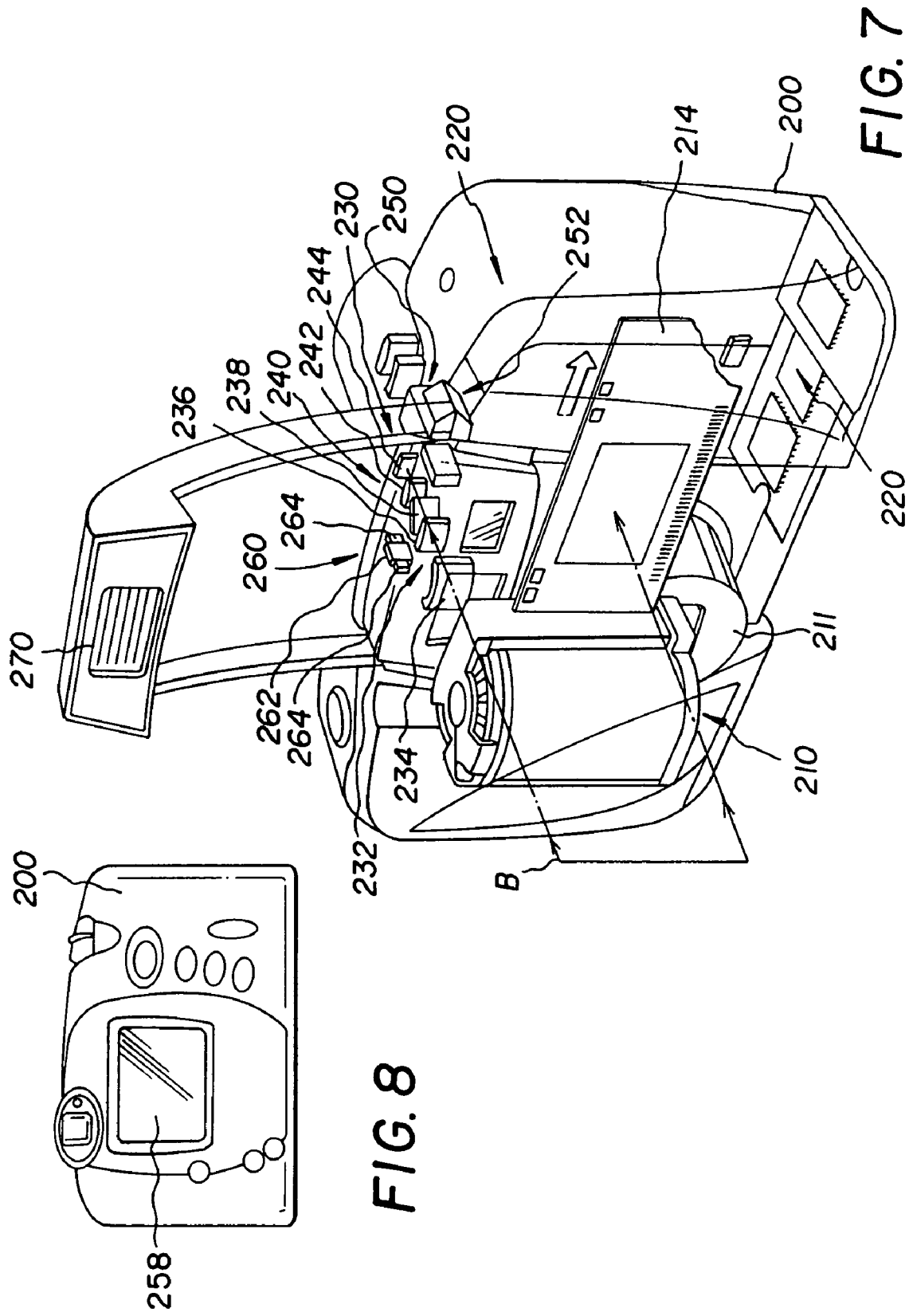

CAMERA SYSTEM WITH EYE MONITORING

CROSS REFERENCE TO RELATED APPLICATIONS

Reference is made to commonly assigned U.S. patent application Ser. No. 09/721,222, entitled "Method For Adding Personalized Metadata to a Collection of Digital Images" filed by Parulski et al. on Nov. 22, 2000; Ser. No. 10/036,113, entitled "Method For Creating and Using Affective Information in a Digital Imaging System" filed by Matraszek et al on Dec. 26, 2001; Ser. No. 10/036/123 entitled "Method for Using Affective Information Recorded With Digital Images for Producing an Album Page" filed by Matraszek et al., on Dec. 26, 2001, the disclosures of which are incorporated herein by reference. Reference is also made to U.S. patent application Ser. No. 10/304,127 entitled "Imaging Method and System" filed by Fedorovskaya et al. on Nov. 25, 2002; Ser. No. 10/304,037 entitled "Method And System For Creating And Using Affective Information In An Image Capture Device For Health Monitoring And Personal Security"; filed by Fedorovskaya et al. on Nov. 25, 2002; and Ser. No. 10/303,520 entitled "Method and Computer Program Product for Determining an Area of Importance in an Image Using Eye Monitoring Information" filed by Miller et al. on Nov. 25, 2002.

FIELD OF THE INVENTION

The present invention relates to imaging systems that employ eye gaze tracking.

BACKGROUND OF THE INVENTION

Many digital imaging systems are available today. These digital imaging systems capture a digital images directly using digital image capture systems or digitize an image captured using analog or photochemical image capture systems to create a digital imaging file. Digital image files can be manipulated using digital image processing, displayed on an electronic display or printed using a digital printing system. A typical device for capturing a digital image is a digital camera, such as the DX 3900 sold by Eastman Kodak Company, Rochester, N.Y., USA. An image may be digitized using a digital scanning system, such as the one embedded within Eastman Kodak Company's Picture Maker kiosk or other well known film or print image scanners.

One advantage of digital images is that users can apply manual digital image processing and editing tools, such as the crop and zoom tools provided in the Kodak Picture CD software sold by Eastman Kodak Company, Rochester, N.Y., U.S.A. To improve the appearance of digital images these image editing tools allow a user to crop the image to change the relative importance of objects in the image. For example, the user can crop the image to emphasize important elements, and/or to remove unimportant or distracting elements of the image. Other image modification tools can also be usefully applied to portions of images that a user considers to be important. However, these tools typically require that the user manually designate what is important in each image that is to be edited. Many users find this process time consuming and, accordingly, few images are edited.

Automatic and semi-automatic image processing and editing algorithms are known. These can be applied to enhance the quality of a digital image without requiring manual user input. These automatic and semi-automatic image processing algorithms analyze the content of an image and apply various assumptions about what the user would likely find to be important elements of an image. For example, large oval shaped objects having color that approximates known flesh tones can be assumed to be important to the photographer. The degree of presumed importance can be increased where, for example, the large oval face shaped objects are positioned near the center of an image or other parts of the image that well know artistic practices deem compostionally important. Additionally, frequency analysis of the digital data that forms digital images can be used to identify elements of an image that are considered to be of greater importance. See for example, commonly assigned U.S. Pat. No. 6,282,317, entitled "Method For Automatic Determination of Main Subjects in Photographic Images" filed by Luo et al. on Dec. 31, 1998, and U.S. Pat. No. 6,345,274, entitled "Method and Computer Program Product for Subjective Image Content Similarity-based Retrieval" filed by Zhu et al. on Jun. 29, 1998. Such algorithms make assumptions about what is important in an image based upon analysis of the visual elements of the captured image. It will be appreciated however, that such algorithms rely at least in part upon the ability of the photographer to capture an image that reflects the intent of the photographer.

Knowledge of what a photographer found to be important in an image can be useful for other purposes. For example, when searching for images, a photographer must manually sort through images or manually input text based descriptions of images to enable an image search. What is preferred of course, is for the photographer to submit an exemplar image from which similar images can be identified. The '274 patent describes image processing algorithms that allow images to be searched by identifying images that are like the exemplar. However, photographs typically contain many objects, shapes, textures, colors, and other visual elements that may or may not be important in the search for similar images. Therefore, algorithms that search for images based upon an exemplar, are required to make assumptions about which elements of the image are important in order to reduce the possibility that images will be identified by the algorithms as being similar to the exemplar based upon the presence of visual elements that are not important to the searcher. It will be appreciated that there are many other useful ways in which information about what is important in an image can be used to make it easier to store, process, archive, and recall such an image.

Therefore there is a need for an automatic way to determine what visual elements in an image are important.

Psychologists have employed equipment that detects the eye gaze position of an observer of an image to understand the visual elements of the image that the observer finds interest in or relies upon to make decisions. For example, in an article entitled "Oculomotor Behavior and Perceptual Strategies in Complex Tasks," published in Vision Research, Vol. 41, pp. 3587–3596, 2001 by Pelz et al., describes an eye gaze tracking system that was used to examine the eye fixations of people washing their hands. Almost all fixations made by an observer of such images are of visual elements such as soap containers, hands, sinks and other elements that are important to locate in order to complete the task of hand and face washing. Thus, these areas correspond to the most important scene elements within this class of scene. Similarly articles entitled "Eye Movements and Vision" published by Plenum Press, 1967, by Yarbus and "How People Look at Pictures: A Study of The Psychology of Perception in Art" published in the University of Chicago Press, 1935 by Buswell, note that people primarily fixate their point of eye gaze on what they believe to be the important elements of a photograph or painting. This research indicates that the importance of scene elements to a user may be ascertained by capturing the user's eye fixations, and using the frequency of occurrence and/or duration of fixations on particular objects within a scene to predict the relative importance of scene elements.

Similarly, the data described in a paper entitled "Looking at Pictures: Affective, Facial, Visceral, and Behavioral Reactions", published in Psychophysiology, Vol. 30, pp. 261–273, by Lang et al., 1993, indicates that on average, viewing time linearly correlates with the degree of the interest or attention an image elicits from an observer. Thus, such a relationship allows interpreting the fixation times and locations as the user's degree of interest toward an area of a scene.

Eye gaze tracking has been proposed for use in monitoring consumer reactions to a scene. One example of this is the Blue Eyes camera developed by International Business Machines, Armonk, N.Y., U.S.A. which uses video monitoring and eye gaze tracking to determine consumer reactions to different displays and promotions in a retail environment. Eye gaze tracking has also been proposed for use in helping people with disabilities to use electronic equipment. One example of this is the Eyegaze System sold by LC Technologies, Inc., Fairfax, Va., U.S.A. which uses video monitoring of a computer user's eyes to help the user to utilize a computer. A version of the remote eye-tracking camera ASL model 504 sold by Applied Science Laboratories, Boston, M.A., U.S.A. can also be used for this purpose.

Eye gaze monitoring devices have been employed in film cameras to help the user guide the focus of these cameras. For example, U.S. Pat. No. 5,765,045, entitled "Camera Capable of Detecting Eye-Gaze" filed on Jun. 7, 1995, by Takagi et al. and Japanese Publication, No. JP 2001 116985, entitled "Camera With Subject Recognizing Function and Subject Recognizing Method" filed by Mitsuru on Oct. 12, 1999, discuss the use of the eye gaze monitoring devices in the viewfinders of the cameras described therein. The cameras described in these references are automatic focus cameras that utilize multi-spot range finding techniques that divide a photographic scene into a plurality of spots or regions and determine a distance from the camera to each spot. The output of this eye gaze monitoring device is used to help the camera determine which of these spots are most likely to contain the subject of the image, and to focus the camera to capture images at a distance that is associated with the spot. The camera is focused at the distance from the camera to the spot identified as being most likely to contain the subject.

Eye gaze monitoring devices have also been employed in film cameras for other purposes. See for example, U.S. Pat. No. 5,831,670 entitled "Camera Capable of Issuing Composition Information" filed by Suzuki on Jun. 18, 1996. In the '670 patent, the field of view of the viewfinder is partitioned and the eye gaze of the photographer during composition is associated with one of the partitions. The relative amount of time that the photographer's eye gaze dwells at particular partitions during the composition is used to determine whether there is a risk of bad image composition. Where such a risk is identified, a warning device such as a vibration or warning light is provided to the user of the camera.

The use of eye gaze monitoring has also been discussed in the context of image compression in digital imaging systems. For example, U.S. Pat. No. 6,252,989, entitled "Foveated Image Coding System and Method for Image Bandwidth Reduction" filed by Geissler on Dec. 23, 1997, discusses a technique termed "foveated imaging" in which an observer's eye gaze position is monitored in real-time and communicated to a real-time image capture system that compresses the image to maintain high frequency information near the observers point of eye gaze and discards high frequency information in regions that are not near the observer's point of gaze.

Thus, cameras are known that are adapted to monitor eye gaze direction and use information from eye gaze direction information to make decisions about the photographic process. However, the information leading to those decisions is discarded after the image is captured. While it is known to record eye gaze position in the non-analogous art of physiological study, such studies have typically been performed by monitoring the eye gaze position of the observer and making recordings of the eye gaze travel of the observer on a medium such as a videotape or datafile that is separate from the image being observed. This creates difficulties in associating the data with the images and in preserving the association of the image with such data over the useful life of the image.

While in many circumstances eye gaze direction monitoring may provide an indication of which elements in images are important to a user, in other circumstances, eye gaze information may not directly indicate which elements in images are important. For example a user can fixate on an object during composition in order to ensure that image is composed to reduce the appearance of the object in the image. Further, the above described cameras monitor eye gaze direction relative to a reticle in the camera viewfinder. Thus eye gaze direction information obtained by this type of monitoring is not measured relative to actual archival image that is captured. This can lead to erroneous conclusions where the field of view of the camera is shifted during such monitoring.

Thus, what is needed is a camera system that automatically obtains eye information including eye gaze direction information and other information that can be used to determine an area of importance in a captured image and associates the eye information and other information with the captured image. What is also needed is a method for determining an area of importance in the captured image based upon eye information and other information associated with an image.

SUMMARY OF THE INVENTION

In one aspect of the invention a camera system is provided having an image capture system adapted to capture an image of a scene during an image capture sequence and an eye monitoring system adapted to determine eye information including a direction of the gaze of an eye of a user of the camera system. A controller is adapted to store the determined eye information including information characterizing eye gaze direction during the image capture sequence and to associate the stored eye information with the scene image.

In another aspect of the invention, a camera system is provided having an image capture system for capturing images of scene during an archival image capture sequence, an eye monitoring system adapted to determine eye information from an eye of a user and a source of context information. A controller is adapted to store the eye information and context information during the archival image capture sequence and to associate the information with an archival image captured during the archival image capture sequence.

In still another aspect a method for operating a camera system is provided. In accordance with the method, eye information is monitored including the eye gaze direction of an eye of a user of the camera and an archival image is captured during the image capture sequence. Information characterizing the eye information is stored during the image capture sequence and the stored eye information is associated with the captured image.

In a further embodiment, a method for operating a camera system is provided. In accordance with this method eye information including eye gaze direction of an eye of the user during an image capture sequence is determined and context information is determined during the image capture sequence. An archival image is captured during the image capture sequence. Information characterizing the eye information and context information during the image capture sequence is stored and the stored eye information and the context information are associated with the archival image.

Advantages

The present invention has the advantage that it allows an efficient and naturalistic method for obtaining information that can be used to make determinations about what a photographer or observer finds to be important in an image and for associating that information with the image. This information can then be employed with digital image processing techniques to provide improved image enhancement, image search and retrieval, and other system improvements that benefit from an understanding of the elements of an image that are important to the user.

BRIEF DESCRIPTION OF THE DRAWINGS

FIG. 4 is a flow diagram of another embodiment of a method for operating a camera system.

FIG. 5 is a back view of the camera system of FIG. 4.

FIG. 6 is a schematic illustration of another embodiment of a viewfinder with an eye monitoring system.

FIG. 7 is an illustration of another embodiment of camera system.

FIG. 8 is a back view of the embodiment of FIG. 7.

DETAILED DESCRIPTION OF THE INVENTION

Figure 1:
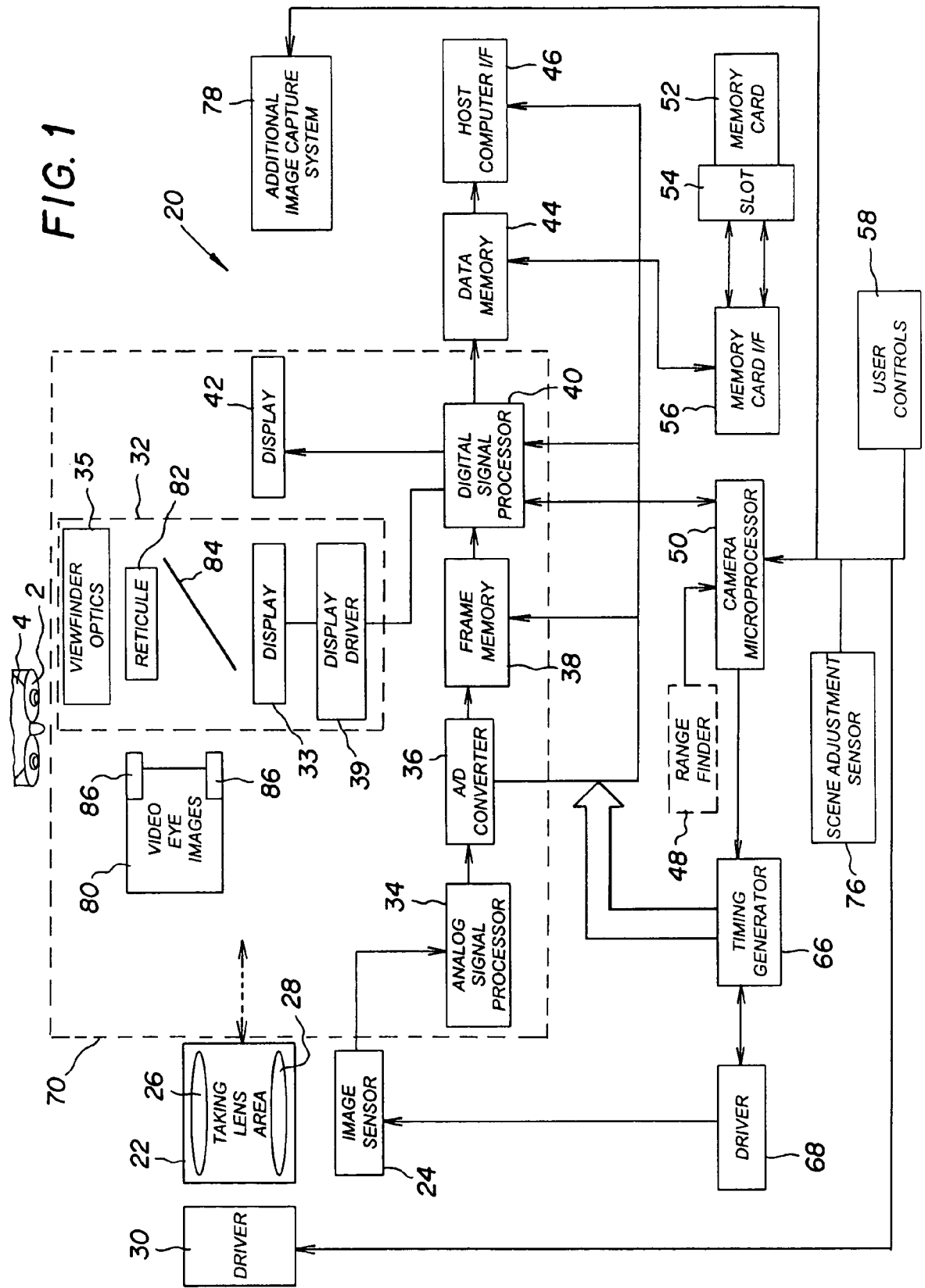
FIG. 1 is an illustration of one embodiment of a camera system having an eye gaze monitoring system.

FIG. 1 shows a block diagram of an embodiment of a camera system 20 for capturing digital still images. As is shown in FIG. 1, camera system 20 includes a taking lens unit 22, which directs light from a subject (not shown) to form an image on an image sensor 24.

The taking lens unit 22 can be simple, such as having a single focal length with manual focusing or a fixed focus. In the example embodiment shown in FIG. 1, taking lens unit 22 is a motorized 2× zoom lens unit in which a mobile element or elements 26 are driven, relative to a stationary element or elements 28 by lens driver 30. Lens driver 30 controls both the lens focal length and the lens focus position. A viewfinder system 32 enables a user 4 to compose the image as will be described in greater detail below.

Various methods can be used to determine the focus settings of the taking lens unit 22. In a preferred embodiment, image sensor 24 is used to provide multi-spot autofocus using what is called the "through focus" or "whole way scanning" approach. The scene is divided into a grid of regions or spots, and the optimum focus distance is determined for each image region. The optimum focus distance for each region is determined by moving the camera lens through a range of focus distance positions, from the near focus distance to the infinity position, while capturing images. Depending on the camera design, between four and thirty-two images may need to be captured at different focus distances. Typically, capturing images at eight different distances provides suitable accuracy.

The captured image data is then analyzed to determine the optimum focus distance for each image region. This analysis begins by band-pass filtering the sensor signal using one or more filters, as described in commonly assigned U.S. Pat. No. 5,874,994 "Filter Employing Arithmetic Operations for an Electronic Synchronized Digital Camera" filed by Xie et al., on Dec. 11, 1995, the disclosure of which is herein incorporated by reference. The absolute value of the band-pass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a preferred embodiment, the image regions corresponding to a target object (e.g. a person being photographed) are determined. The focus position is then set to provide the best focus for these image regions. For example, an image of a scene can be divided into a plurality of sub-divisions. A focus evaluation value representative of the high frequency component contained in each subdivision of the image can be determined and the focus evaluation values can be used to determine object distances as described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

In one embodiment, the bandpass filtering and other calculations used to provide autofocus in camera system 20 are performed by digital signal processor 40. In this embodiment, camera system 20 uses a specially adapted image sensor 24, as is shown in commonly assigned U.S. Pat. No. 5,668,597 entitled "Electronic Camera With Rapid Autofocus Upon An Interline Image Sensor", filed by Parulski et al. on Dec. 30, 1994, the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus taking lens unit 22.

In an alternative embodiment, camera system 20 uses a separate optical or other type (e.g. ultrasonic) of rangefinder 48 to identify the subject of the image and to select a focus position for taking lens unit 22 that is appropriate for the distance to the subject. Rangefinder 48 operates lens driver 30, directly or by camera microprocessor 50, to move one or more mobile elements 26 of taking lens unit 22. Rangefinder 48 can be passive or active or a combination of the two. A wide variety of suitable multiple sensor rangefinders 48 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses such a rangefinder 48. A feedback loop is established between lens driver 30 and camera microprocessor 50 so that camera microprocessor 50 can accurately set the focus position of taking lens unit 22. The focus determination provided by rangefinder 48 can be of the single-spot or multi-spot type. Preferably, the focus determination uses multiple spots. In multi-spot focus determination, the scene is divided into a grid of regions or spots, and the optimum focus distance is determined for each spot.

Image sensor 24 has a discrete number of photosensitive elements arranged in a two-dimensional array. Each individual photosite on image sensor 24 corresponds to one pixel of the captured digital image, referred to herein as an archival image. Image sensor 24 can be either a conventional charge coupled device CCD sensor or a complementary metal oxide semiconductor image sensor. In one example embodiment, image sensor 24 has an array of 1280×960 photosensitive elements. The photosensitive elements, or photosites, of image sensor 24 convert photons of light from the scene into electron charge packets. Each photosite is overlaid with a color filter array, such as the Bayer color filter array described in commonly assigned U.S. Pat. No. 3,971,065, entitled "Color Imaging Array" filed by Bayer on Mar. 7, 1975, the disclosure of which is herein incorporated by reference. The Bayer color filter array has 50% green pixels in a checkerboard mosaic, with the remaining pixels alternating between red and blue rows. The photosites respond to the appropriately colored incident light illumination to provide an analog signal corresponding to the intensity of illumination incident on the photosites.

The analog output of each pixel is amplified by an analog amplifier (not shown) and analog processed by an analog signal processor 34 to reduce the output amplifier noise of image sensor 24. The output of the analog signal processor 34 is converted to a captured digital image signal by an analog-to-digital (A/D) converter 36, such as, for example, a 10-bit A/D converter which provides a 10 bit signal in the sequence of the Bayer color filter array.

The digitized captured digital image signal is temporarily stored in a frame memory 38, and is then processed using a programmable digital signal processor 40 as described in commonly assigned U.S. Pat. No. 5,016,107 entitled "Electronic Still Camera Utilizing Image Compression and Digital Storage" the disclosure of which is herein incorporated by reference. The image processing includes an interpolation algorithm to reconstruct a full resolution color image from the color filter array pixel values using, for example, the methods described in commonly assigned U.S. Pat. No. 5,373,322 entitled "Apparatus and Method for Adaptively Interpolating a Full Color Image Utilizing Chrominance Gradients" filed by LaRoche et al. on Jun. 30, 1993, and U.S. Pat. No. 4,642,678 entitled "Signal Processing Method and Apparatus for Producing Interpolated Chrominance Values in a Sampled Color Image Signal" filed by Cok on Feb. 3, 1986, the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

Digital signal processor 40 uses the initial images to create archival images of the scene. Archival images are typically high resolution images suitable for storage, reproduction, and sharing. Archival images are optionally compressed using the JPEG standard and stored in a data memory 44. The JPEG compression standard uses the well-known discrete cosine transform to transform 8×8 blocks of luminance and chrominance signals into the spatial frequency domain. These discrete cosine transform coefficients are then quantized and entropy coded to produce JPEG compressed image data. This JPEG compressed image data is stored using the so-called "Exif" image format defined in "Digital Still Camera Image File Format (Exif)" version 2.1, JEIDA-49-1998, July 1998 by the Japan Electronics Industries Development Association Tokyo, Japan. The Exif format archival image can also be stored in a memory card 52. In the embodiment of FIG. 1, camera system 20 is shown having a memory card slot 54 which holds a removable memory card 52 and has a memory card interface 56 for communicating with memory card 52. An Exif format archival image and any other digital data can also be transmitted to a host computer (not shown), which is connected to camera system 20 through a host computer interface 46. Host computer interface 46 can be for example, an optical, radio frequency or other transducer that converts image and other data into a form that can be conveyed to a host computer or network (not shown) by way of an optical signal, radio frequency signal or other form of signal.

Digital signal processor 40 also creates smaller size digital images based upon initial images. These smaller size images are referred to herein as evaluation images. Typically, the evaluation images are lower resolution images adapted for display on viewfinder display 33 or exterior display 42. Viewfinder display 33 and exterior display 42 can comprise, for example, a color liquid crystal display (LCD), organic light emitting display, or other type of video display. During an image capture sequence, digital signal processor 40 can use the initial images to generate evaluation images, archival images or both. As used herein, the term "image capture sequence" comprises at least an image composition phase and can optionally also include an image capture phase and a verification phase. During the composition phase a stream of initial images is captured and digital signal processor 40 generates a stream of evaluation images based upon the initial images. The evaluation image can be created and displayed immediately after the archival image is captured, and can be created as described using for example resampling techniques described in commonly assigned U.S. Pat. No. 5,164,831 "Electronic Still Camera Providing Multi-Format Storage Of Full And Reduced Resolution Images" by Kuchta et al., on Mar. 15, 1990, the disclosure of which is herein incorporated by reference. Evaluation images can be stored in data memory 44. The stream of evaluation images is presented on viewfinder display 33 or exterior display 42. User 4 observes the stream of evaluation images and uses the evaluation images to compose the image.

During the capture phase, camera microprocessor 50 sends a capture signal causing digital signal processor 40 to select an initial image and to process the initial image to form an archival image. A corresponding evaluation image is also formed. During the verification phase the corresponding evaluation image is supplied to viewfinder display 33 or exterior display 42 and is presented for a period of time. This permits user 4 to verify that the appearance of the captured archival image is acceptable.

In one alternative embodiment the images that are captured by image sensor 24 are captured in the form of an archival image which is then modified for use as an evaluation image. In another alternative embodiment, camera system 20 has more than one system for capturing images. For example, in FIG. 1 an optional additional image capture system 78 is shown. This additional image capture system can be used for capturing archival images. The additional image capture system 78 can comprise an image capture system that records images using a high resolution digital imager or a photographic element such as a film or plate. Where an additional image capture system 78 is used, the images captured by image sensor 24 can be used to form evaluation images.

Figure 2:
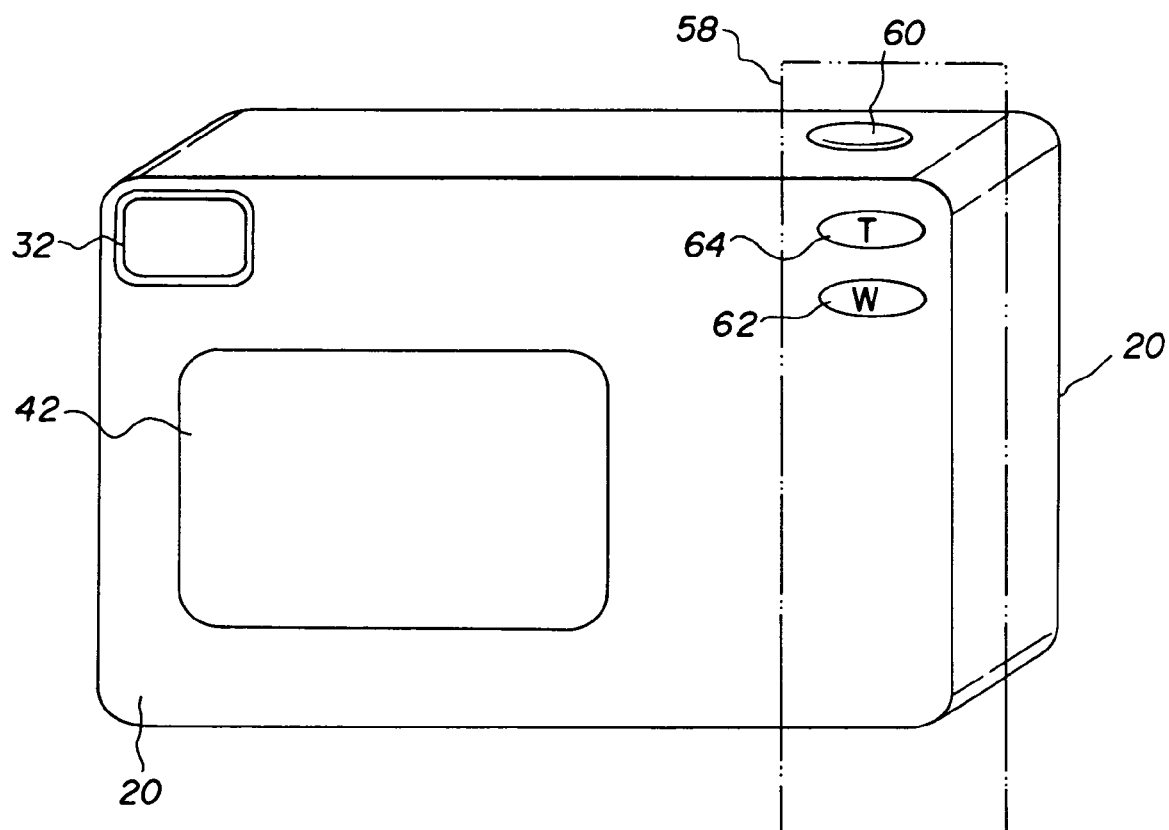
FIG. 2 is an illustration of a back view of the camera system of FIG. 1.

Camera system 20 is controlled by user controls 58, some of which are shown in more detail in FIG. 2. User controls 58 include a shutter release 60 which initiates a picture taking operation by sending a signal to camera microprocessor 50 indicating user 4's desire to capture an image. Camera microprocessor 50 responds to this signal by sending a capture signal to digital signal processor 40 as is generally described above. A "wide" zoom lens button 62 and a "tele" zoom lens button 64, are provided which together control both a 2:1 optical zoom and a 2:1 digital zoom feature. The optical zoom is provided by taking lens unit 22, and adjusts the magnification in order to change the field of view of the focal plane image captured by the image sensor 24. The digital zoom is provided by the digital signal processor 40, which crops and resamples the captured image stored in the frame memory 38. When user 4 first turns on camera system 20, the zoom lens is set to the 1:1 position, so that all sensor photoelements are used to provide the captured image, and the taking lens unit 22 is set to the wide angle position. In a preferred embodiment, this wide angle position is equivalent to a 40 mm lens on a 35 mm film camera. This corresponds to the maximum wide angle position.

When the user then depresses the "tele" zoom lens button 64, taking lens unit 22 is adjusted by camera microprocessor 50 via the lens driver 30 to move taking lens unit 22 towards a more telephoto focal length. If user 4 continues to depress the "tele" zoom lens button 64, the taking lens unit 22 will move to the full optical 2:1 zoom position. In a preferred embodiment, this full telephoto position is equivalent to a 40 mm lens on a 35 mm film camera. If user 4 continues to depress the "tele" zoom lens button 64, the taking lens unit 22 will remain in the full optical 2:1 zoom position, and digital signal processor 40 will begin to provide digital zoom, by cropping (and optionally resampling) a central area of the image. While this increases the apparent magnification of the camera, it causes a decrease in sharpness, since some of the outer photoelements of the sensor are discarded when producing the archival image. However, this decrease in sharpness would normally not be visible on the relatively small viewfinder display 33 and exterior display 42.

For example, in camera system 20 of FIG. 1, the captured image is derived from a high resolution image sensor 24, having for example 1280×960 photosites, corresponding to about 1.25 megapixels. The term resolution is used herein to indicate the number of picture elements used to represent the image.

Exterior display 42, however, has lower resolution providing, for example, 320×240 elements, which correspond to about 0.08 megapixels. Thus, there are 16 times more sensor elements than display elements. Accordingly, it is necessary to resample the initial image into an evaluation image having a suitably small image size so that it can properly fit on viewfinder display 33 or exterior display 42. This resampling can be done by using low pass filtering, followed by sub-sampling, or by using bilinear interpolation techniques with appropriate anti-aliasing conditioning. Other techniques known in the art for adapting a high resolution image for display on a relatively low resolution display can alternatively be used.

The resampling of the captured image to produce an evaluation image having fewer pixels (i.e. lower resolution) than the captured image is performed by digital signal processor 40. As noted earlier, signal processor 40 can also provide digital zooming. In the maximum 2:1 setting, signal processor 40 uses the central 640×480 sensor area to provide the archival image by interpolating this central area up to 1280×960 samples.

Digital signal processor 40 can also modify the evaluation images in other ways so that the evaluation images match the appearance of a corresponding archival image when viewed on viewfinder display 33 or exterior display 42. These modifications include color calibrating the evaluation images so that when the evaluation images are presented on a viewfinder display 32 or exterior display 42, the displayed colors of the evaluation image appear to match the colors in the corresponding archival image. These and other modifications help to provide user 4 with an accurate representation of the color, format, scene content and lighting conditions that will be present in a corresponding archival image.

As noted above, because evaluation images are displayed using an electronic display that has lower resolution than a corresponding archival image, an evaluation image may appear to be sharper when viewed through viewfinder display 33 or exterior display 42 than it will appear when the archival image is printed or otherwise displayed at higher resolution. Thus, in one optional embodiment of the present invention, each evaluation image can be modified so that areas that will appear out of focus in a corresponding archival image could appear to be out of focus when viewed on an electronic display such as exterior display 42. Moreover, when the digital zoom is active, the entire image is softened, but this softening would normally not be visible in exterior display 42. For the example in camera system 20 of FIG. 1, viewfinder display 42 can be a display having 320×240 pixels while the archival image is provided using a sensor area of 640×480 pixels in the maximum digital zoom setting. Thus, the evaluation image displayed on exterior display 42 after normal resizing will appear suitably sharp. However, the archival image will not produce an acceptably sharp print. Therefore, a resampling technique can be used which creates an evaluation image having 320×240 pixels, but having reduced apparent sharpness when the maximum digital zoom setting is used.

It will be appreciated that the apparent sharpness of a print or other tangible output that is made from the archival image is also a function of the size of the rendered image. As described in commonly assigned U.S. patent application Ser. No. 10/028,644 entitled "Method and Camera System for Blurring Portions of a Verification Image To Show Out of Focus Areas in a Captured Archival Image", filed by Belz, et al. on Dec. 21, 2001, camera system 20 can optionally have an input (not shown) for receiving a signal indicating the expected size of the output and can adjust the apparent sharpness of the evaluation image accordingly and/or provide a warning.

Camera system 20 also incorporates an eye monitoring system 70. In the embodiment of FIGS. 1 and 2, eye monitoring system 70 detects eye 2 of user 4 that is positioned to view images through viewfinder system 32. Eye monitoring system 70 incorporates a video eye imager 80, for example a conventional charge couple device imager, a complimentary metal oxide imager or a charge injection device. Other imaging technologies can also be used. The images that are captured by video eye imager 80 can include video images of the type captured by image sensor 24 containing an image of eye 2.

Video eye imager 80 can capture eye information in other forms. For example, images that represent eye position and pupil size do not necessarily need to constitute full digital images of an eye 2 or eye 3 of user 4. Instead, other forms of imaging can be used that have lower resolution or use a non-linear imaging pattern. Using such lower resolution or non-linear technologies can reduce costs, simplify the imaging structure, and increase the speed at which eye information can be obtained.

Eye monitoring system 70 monitors the position of a stable feature of eye 2 of user 4 to determine eye gaze information. Examples of such stable features include the reflections from the front or back of the cornea of eye 2, reflections from the front or back surface of the lens of eye 2, structural patterns within an iris of eye 2 and the center of a pupil of eye 2. Optionally, eye monitoring system 70 can also capture an image of the pupil of eye 2 of user 4 so that the pupil size of user 2 can be determined. Eye monitoring system 70 can also track the relative position of the center of the pupil and the reflection of a light source 86 from the back of the cornea to determine eye gaze information.

Eye monitoring system 70 can be calibrated in a variety of ways to ensure that eye monitoring system 70 collects data that accurately reflects conditions at eye 2 of user 4. In one embodiment, eye monitoring system 70 performs a positional calibration. In this embodiment eye monitoring system 70 incorporates a reticle 82 which defines a border about the images presented by viewfinder system 32. In this embodiment, user 4 is directed to look at predefined positions on reticle 82. Data is obtained from observation of eye 2 of user 4 when user 4 is looking at each predefined position. Eye monitoring system 70 obtains profile data at each position. Eye monitoring system 70 compares eye information obtained by observing eye 2 to the data in this profile to compose data that depicts the eye gaze movement of user 4 as eye 2 is moved about reticle 82. In one embodiment, eye monitoring system 70 can detect a corneal reflection and the center of a pupil. A vector can then be drawn between these two points. Once the length and direction of this vector is known for multiple horizontal and vertical positions on the reticle, these values can then be used to determine the eye gaze fixation point anywhere within the viewfinder.

The relationship between the vector that is drawn and the gaze position of eye 2 of user 4 is dependent on the curvature of a cornea of eye 2. This curvature varies from person to person. Thus, while a model cornea can be used for initial correlation purposes, more detailed information can be obtained by calibrating eye monitoring system 70 for each user 4 of eye monitoring system 70.

One embodiment of eye monitoring system 70 is shown in FIG. 1. In this embodiment, eye monitoring system 70 is incorporated into viewfinder system 32 of camera system 20. In this embodiment, viewfinder system 32 comprises viewfinder optics 35 that focus image modulated light from viewfinder display 33 so that the image modulated light forms an image that is viewable by a properly positioned eye 2 of user 4. An optical beam splitter 84 such as a half-silvered mirror is positioned between the viewfinder optics 35 and viewfinder display 33. Light sources 86 supply light that is directed onto beam splitter 84 and deflected through viewfinder optics 35 to illuminate eye 2. Light sources 86 can supply light at a variety of wavelengths including visible and non-visible wavelengths.

Light that illuminates eye 2 returns to beam splitter 84 and is deflected by beam splitter 84 onto video eye imager 80. In this embodiment, video eye imager 80 has an arrangement of pixels each adapted to sample the amount of light incident on the pixel. This light can be in the visible or non-visible wavelengths. The analog output of each pixel is amplified and analog processed by an analog signal processor such as analog signal processor 34 to reduce the output amplifier noise of video eye imager 80. The output of the analog signal processor 34 is converted to a digital image signal by an analog-to-digital (A/D) converter 36, such as, for example, a 10-bit A/D converter which provides a 10 bit signal. The analog output of each pixel is amplified and analog processed by an analog signal processor 34 to reduce the output amplifier noise of image sensor 24. The output of the analog signal processor 34 is converted to a digital image signal by an analog-to-digital (A/D) converter 36, such as, for example, a 10-bit A/D converter 36. The signal from A/D converter 36 is stored in frame memory 38 for a temporary period of time and then transferred to digital signal processor 40. In the embodiment described herein digital signal processor 40 is programmable and is programmed as described below to receive and process digital images from video eye imager 80.

Figure 3:
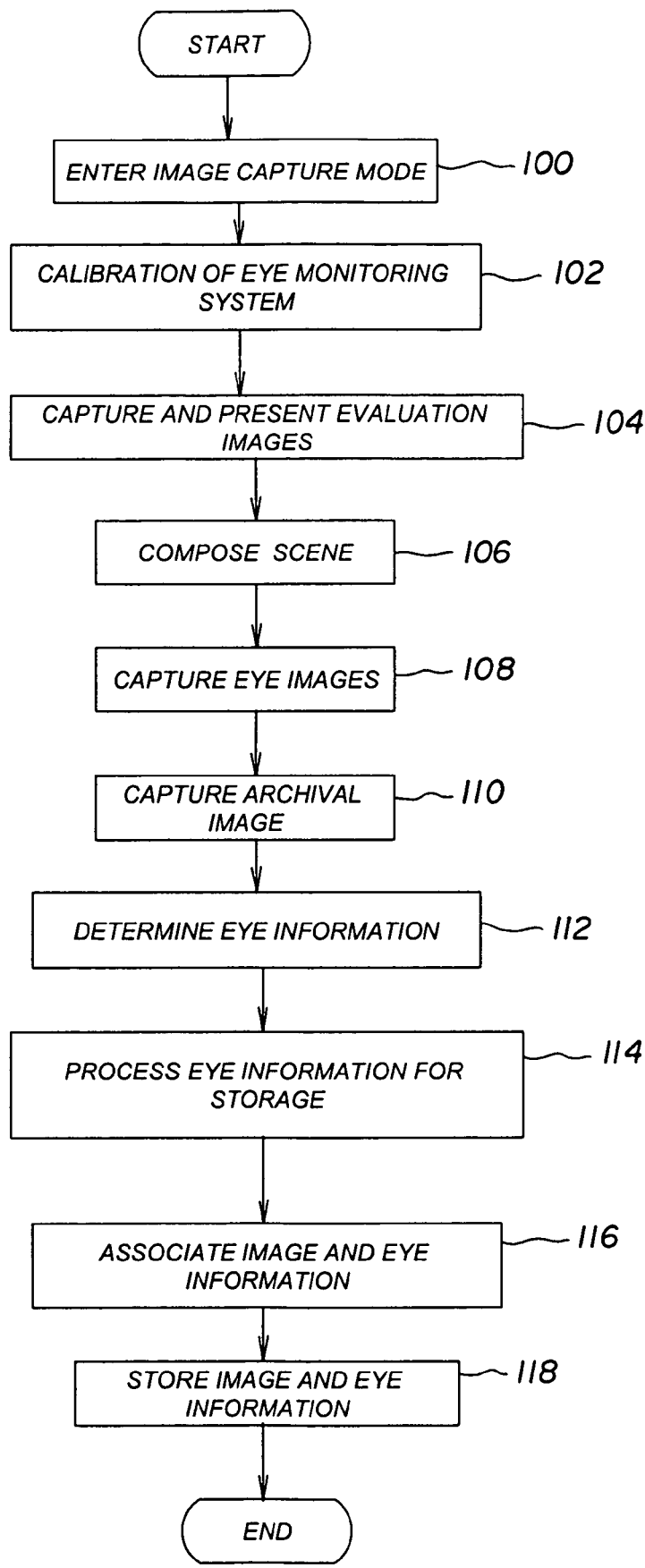
FIG. 3 is a flow diagram of one embodiment of a method for operating a camera system.

FIG. 3 shows an embodiment of a method for operating a camera system such as camera system 20 as described above. As is shown in FIG. 3, an image capture sequence starts by placing camera system 20 in an image composition mode. (step 100). This can be done in a variety of ways. For example, the image composition mode can be entered when camera microprocessor 50 detects that shutter release 60 is moved to a half-depression position. Alternatively, video eye imager 80 can enter the image composition mode in response to the positioning of a mode selection switch (not shown) or when sensors (not shown) detect that camera system 20 is being held in a way that is associated with picture taking. In still another alternative, camera system 20 can enter the image composition mode whenever eye monitoring system 70 detects the presence of an eye 2 of user 4 that is positioned to observe images in viewfinder system 32.

Eye monitoring system 70 can, optionally, be calibrated in the manner described above (step 102). This calibration can be performed in response to manual input. Further, the calibration step can include an eye matching step wherein eye monitoring system 70 examines eye 2 to determine that eye 2 confronting eye monitoring system 70 does not have the set of stable features that matches the set of stable features currently stored in an eye profile and can initialize a calibration process in response to this determination.

While in the image composition mode, camera system 20 causes image sensor 24 to capture a stream of digital images which are converted into evaluation images sized for presentation on viewfinder display 33 (step 104). In the embodiment of FIG. 1, this is done by camera microprocessor 50 sending signals to a timing generator 66. Timing generator 66 is connected, generally, to the elements of camera system 20, as shown in FIG. 1, for controlling the digital conversion, compression, and storage of the image signal. The image sensor 24 is driven from the timing generator 66 via a sensor driver 68 to produce the image signals provided to analog signal processor 34. Each image signal is processed as is described above to form a stream of evaluation images that can be presented on viewfinder display 33.

User 4 uses these evaluation images to compose the scene (step 106). Concurrently, eye monitoring system 70 captures images of eye 2 (step 108). Eye monitoring system 70 examines these images and generates data that tracks the direction of the gaze of eye 2 for each image that is displayed during image composition. User 4 causes camera system 20 to capture an archival image by depressing shutter release 60. In response, the archival image of the scene is captured (step 110). A corresponding evaluation image can also be generated. Eye information characterizing the eye gaze direction of eye 2 of user 4 during the image capture sequence is determined (step 112). Eye gaze information may be stored in a number of forms, including storing coordinates of the eye gaze position with respect to the archival image for each evaluation image that is captured or storing a processed version of this data that indicates information such as eye fixation position and duration of each eye fixation. This eye information can be compressed or otherwise converted into a convenient form for storage (step 114). The eye information is then associated with the archival image (step 116) and stored (step 118). The eye information can be stored within the image information for example using well known digital watermarking techniques, or it can be stored within a digital image file containing an archival image. For example, the eye information can be stored within one or more application segments in a JPEG file in accordance with the JPEG standard format published by the International Standards Organization, ISO 10918-1 (ITU-T.81). The eye information in the application segment can also be recorded as Tagged Image File Format, as defined in the Exchangeable Image File Format version 2.2 published by the Japan Electronics and Information Technology Industries Association JETTA CP-3451. The Tagged Image File Format tags can include both standard prior-art metadata defined in the Exif standard, and metadata providing the eye gaze direction information described earlier (step 118).

FIG. 4 shows another embodiment of a method for operating a camera system such as camera system 20. As is shown in FIG. 4, an image capture sequence starts by placing camera system 20 in an image composition mode. (step 120). While in the image composition mode, camera system 20 causes image sensor 24 to capture a stream of images which are converted into evaluation images sized for presentation on viewfinder system 32 (step 122). In the embodiment of FIG. 1, this is done by camera microprocessor 50 causing images to be captured by sending a signal to timing generator 66. Timing generator 66 is connected, generally, to the elements of camera system 20, as shown in FIG. 1, for controlling the digital conversion, compression, and storage of the image signal. Image sensor 24 is driven from the timing generator 66 via sensor driver 68 to produce the image signals provided to analog signal processor 34. Each image signal is processed as is described above to form a stream of evaluation images that can be presented on viewfinder display 33.

User 4 uses these evaluation images to compose the scene, for example, by adjusting the field of view of camera system 20, adjusting the contents within the field of view or otherwise manipulating the camera-scene arrangement to adjust the appearance of the scene (step 124). Concurrently, video eye imager 80 captures images of eye 2 (step 126). The images of eye 2 are processed by digital signal processor 40 to determine eye information (step 128). In this embodiment, eye information comprises raw data or processed data that characterizes or can be used to characterize the direction of the gaze of eye 2 during the image capture sequence including but not limited to eye fixation and duration, eye movement patterns and eyeball acceleration information. Eye information can also include other information that can be obtained from the images of eye 2. For example, eye information can include eye condition information or other information that allows tracking of other characteristics of the eye such as pupil diameter, tear formation, eye temperature, blood vessel size. Further, eye information can also include user information that can be obtained by analysis of the images of eye 2 such as the heart rate of user 4 which can be determined based upon changes in the color or size of blood vessels that are in eye 2, that occur during the image capture sequence. In certain embodiments, the eye information can also include the identity of a photographer based upon the eye information which can optionally be determined by analysis of eye images.

In the embodiment shown, camera system 20 is also adapted to determine context information (step 130). As used herein, context information includes information from the scene, the user or the camera system 20 that can be used to help interpret the possible meaning of images captured by eye monitoring system 70. Context information can include audio signals, brightness and other scene based information. Context information can also include location information such as Global Positioning System location information or other information indicating a location. User controls 58 of camera system 20 can also include a transducer (not shown) allowing a user to input an indication of the nature of the event being captured. Other context information can also include zoom setting information that tracks the zoom settings of taking lens unit 22 during an image capture sequence. The zoom setting information can be correlated to the eye gaze tracking information so that the eye gaze direction information reflects such changes. Other user settings can also be tracked during the image capture sequence, such as a user's selection or setting of gamma, brightness, or other image characteristics, or the user's selection of a timed capture mode, or a user's input that indicates the nature of the scene being photographed.

In one embodiment, the context information includes information that can be used to determine what scene composition adjustments are made during composition. This scene adjustment information can be obtained in a variety of ways. For example in one embodiment, a composite image is formed during the composition phase of the image capture sequence. In this embodiment, as the first image of the stream of evaluation images is captured, it is stored and the eye gaze direction information is registered with respect to the center of this image. As the second image is captured, algorithms such as image motion vector analysis or correlation analysis are used to align and overlap any regions from the first image with the second image. Once a degree of overlap between these two images is determined, any new scene information that is contained in the second image is composited with the scene information from the first image and the eye gaze direction information is registered with reference to the composite image. This process continues during the image capture sequence.

The scene adjustment information can also comprise a data record that characterizes changes in the scene composition during the image capture sequence. For example, digital signal processor 40 can use vector analysis or correlation analysis to compare sets of evaluation images captured during composition in order to derive data that characterizes the change in scene composition between the compared sets of images. Other forms of scene analysis can be used including analysis of the movement of fiducials during the image capture sequence. Alternatively, scene adjustment data can also be obtained from optional scene adjustment sensors 76 that derive scene adjustment information that is based upon Global Positioning System data, inertial movement sensors, a multi-position fluidic switch, gyroscopic information, or using other known sensors that can generate data that is indicative of the movement of camera system 20 during the image capture sequence. This scene adjustment data can be correlated to information regarding eye gaze movement during image capture.

It will be appreciated that in the process of composing some scenes, or in the process of developing a data record that characterizes scene adjustment, the changes in scene composition may become so different that there is no overlap between the first image gathered during composition and the later images being gathered during composition. Where this occurs the scene adjustment data and all eye movement data that has been collected to that point in time is discarded and the new image is used to begin to composite a new image.

When user 4 composes a scene with a useful appearance, user 4 causes camera system 20 to capture an archival image by depressing shutter release 60. In response, an image of the scene is captured and stored (step 132). An evaluation image that corresponds to the captured archival image can be formed as described above and presented to the user by way of viewfinder system 32 immediately after capture. This allows user 4 to verify that the image actually captured by viewfinder system 32 is acceptable to user 4 (step 134). Where this is done, eye monitoring system 70 can continue to obtain eye information during the review of the evaluation image by user 4.

The composition adjustment information and eye information obtained during the composition phase is associated with the archival image (step 136). As described above, this information can be stored in a file extension or in a record that is separate from an image but associated with the image in a physical or electronic way. The eye information can also be stored in the image using watermarking or other technologies (step 138).

FIGS. 5 and 6 show an alternate embodiment of a camera system 20 wherein exterior display 42 is used to present evaluation images for composition so that user 4 can compose, capture and/or verify an image without holding camera system 20 close to eye 2. In such embodiments, exterior display 42 presents evaluation images in a display space A. In this embodiment eye monitoring system 70 is adapted to detect eye information from an eye 2 of a user 4 that is substantially separated from exterior display 42 but within the display space A. In such embodiments, video eye imager 80 can have an optical system (not shown) that is adapted to facilitate the capture of images of the user 4 to obtain eye information from eye 2 at such distances. This embodiment has the advantage of requiring only one electronic display. Various eye gaze tracking systems can be used in conjunction with this embodiment, such as systems that employ techniques similar to those used in the Blue Eyes system, the ASL model 504 or other eye gaze tracking systems known in the art.

In the embodiment of FIGS. 5 and 6, eye monitoring system 70 can also be adapted to monitor both eye 2 and eye 3 of user 4 to obtain eye information from each eye. Comparison of the signals received from each eye can improve and validate the accuracy of the eye information. Further, it will be appreciated that where user 4 does not hold his or her eyes proximate to camera system 20, it is likely that, at periods of time during composition, the eye gaze direction of user 4 will turn from viewing the scene on exterior display 42 to direct observation of the scene. Video eye imager 80 can be adapted to map the eye gaze direction of eyes 2 and 3 of observer 4 relative to the scene both when eyes 2 and 3 view the scene directly or when eyes 2 and 3 view evaluation images of the scene that are displayed on exterior display 42. Where eyes 2 and 3 observe the scene directly, eye information obtained from eyes 2 and 3 can include information that characterizes the parallax differences between the eye gaze direction of eye 2 and eye 3. This parallax information can be used to automatically determine the focus distance of areas of the image that are of interest to user 4 and can therefore be used to assist in modifying the focus settings for taking lens unit 22 and where camera system 20 comprises a flash illumination system 270 to illuminate a photographic scene, the intensity of the flash can be varied in accordance with the parallax determined distance of the image capture device.

Figure 9:
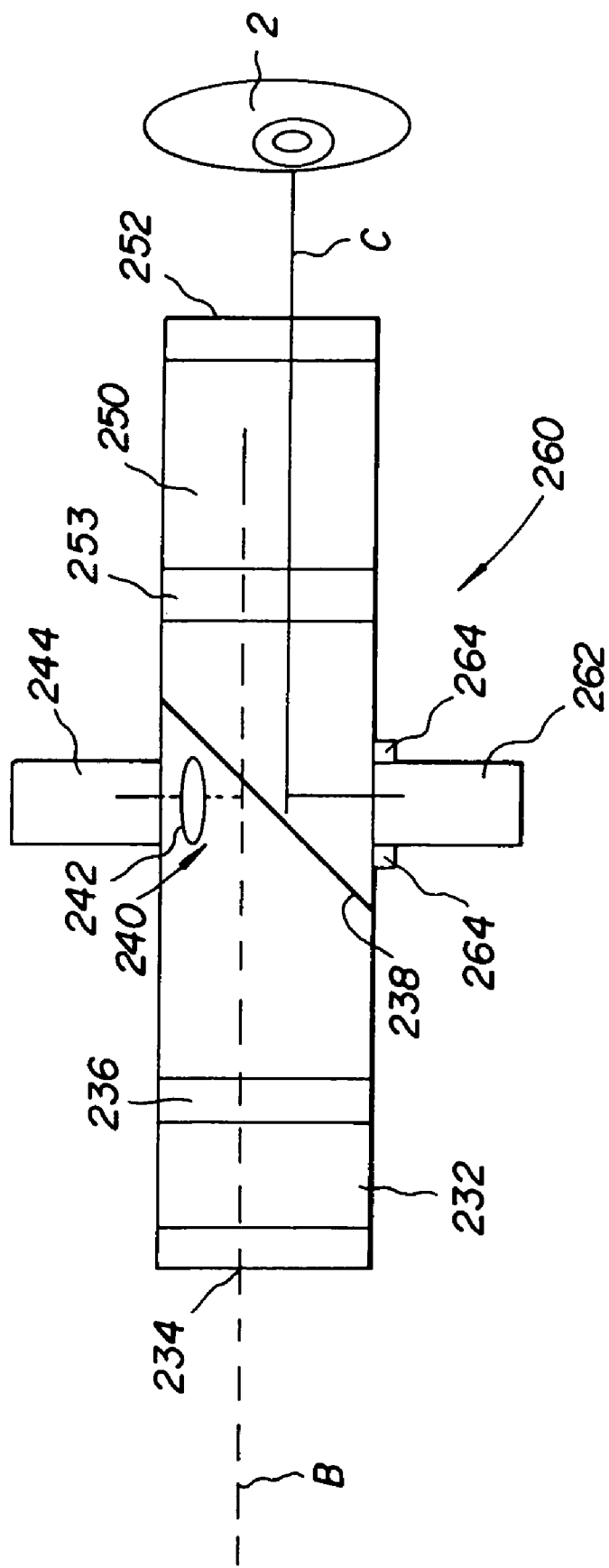
FIG. 9 is a schematic diagram of the viewfinding system and eye monitoring system of the embodiment of FIG. 7.

FIGS. 7, 8 and 9 show another embodiment of a camera system 200 having two image capture systems in accordance with the present invention. In this embodiment, camera system 200 can be a hybrid film electronic camera, a combination film and electronic camera or a combination of electronic cameras. This embodiment of camera system 200 shown in FIGS. 7 and 8 has both a film image capture system 210 and an electronic image capture system 220. Film image capture system 210 is used to capture high-resolution archival images of the scene. Film image capture system 210 comprises a taking lens system 212 such as a zoom lens system 211 shown in phantom in FIG. 7, that focuses light B from a scene onto a film 214 such as Kodak Advantix® film sold by Eastman Kodak Company, Rochester, N.Y., U.S.A., a shutter system (not shown) controllably exposes film 214 to light B and a film movement system (not shown) that advances film 214 between exposures.

Electronic image capture system 220 is integrated with viewfinder system 230. In this embodiment, viewfinder system 230 is adapted to provide an entry optical path 232 having a combination of optical elements shown in this embodiment as an optical element 234 and a zoom optical element 236 that work in combination to allow the image to be zoomed. A beam splitter 238 such as a half-silvered mirror is disposed to separate light B from the scene into a capture path 240 and a composition path 250.

Light that travels along optical capture path 240 passes through an arrangement of optical elements such as optical element 242 to size the image appropriately to image the scene onto a image sensor 244. Imager sensor 244 operates in the same fashion as is described above with reference to imager sensor 244. Electronic image capture system 220 receives a signal from image sensor 244 and processes this signal to capture an image of the scene and to convert this image into a image that can be observed on a display, such as exterior display 260 shown in FIG. 8. Typically, the captured electronic image is modified to reflect the characteristics of the archival image as described above. By presenting the electronic image on exterior display 258, a user can evaluate and verify the image. Electronic image capture system 220 can also store the image in a digital form and exchange the image with other devices as is generally described above.

Light that is deflected by beam splitter 238 along composition path 250 is passed through a set of viewfinder optical elements 252 that modulate and direct this light to form an image at eye 2 of user 4 that matches the appearance of the scene as the scene would appear if captured by film image capture system 210. This allows user 4 to compose a scene.

An eye monitoring system 260 is integrated with viewfinder system 230. FIG. 9 shows a schematic diagram of this embodiment of eye monitoring system 260. Eye monitoring system 260 includes beam splitter 238, viewfinder optical elements 252 and 253, a video eye imager 262 and optional light sources 264. In operation, light sources 264 radiate light C which is partially reflected by beam splitter 238 and deflected through viewfinder optical elements 252 onto eye 2 of user 4. Alternatively, light sources 264 can be arranged elsewhere in composition path 250 with light C being directed toward eye 2. Light C is then reflected by eye 2. This reflected light passes through viewfinder optical elements 252 and is partially reflected by optical beam splitter 238 onto video eye imager 262.

Light sources 264 may emit light that is in the non-visible range such as in the infra-red band. This reduces the likelihood that this light will be deflected onto video scene imager 244 and be interpreted as scene information. For example, if light sources 264 radiate light in the infra-red band, scene imager 244 can be covered with an infrared filter to reject any infrared illumination that reaches it. In this embodiment, video eye imager 262 will be adapted to be responsive to light in the infrared band, and to extract eye information therefrom.

The images obtained using video eye imager 262 can be used to obtain other forms of eye information such as those described above. Further, camera system 200 can be adapted to determine context information as described above.

Electronic image capture system 220 contains digital storage for storing the eye information and context information for later transfer to a computer or electronic storage database. Information that provides a way to find where the eye information and context information is stored can be recorded in association with the archival image by writing this information to film 214. Eye and context information can also be stored, for example, on a strip of magnetic material on film 214. Eye information and context information can also be stored in an optical form on film 214 using for example watermarking techniques and/or other optical exposure techniques to record this data in the photosensitive areas of film 214. Eye information and context information can also be stored on an electronic memory that is associated with the film. Eye information and context information can, for example, be recorded using a binary or other machine readable code. The metadata can be recorded in formatted blocks with each block having a start sentinel, metadata and an end sentinel. For redundancy, multiple copies of each block can be recorded.

Figure 10:
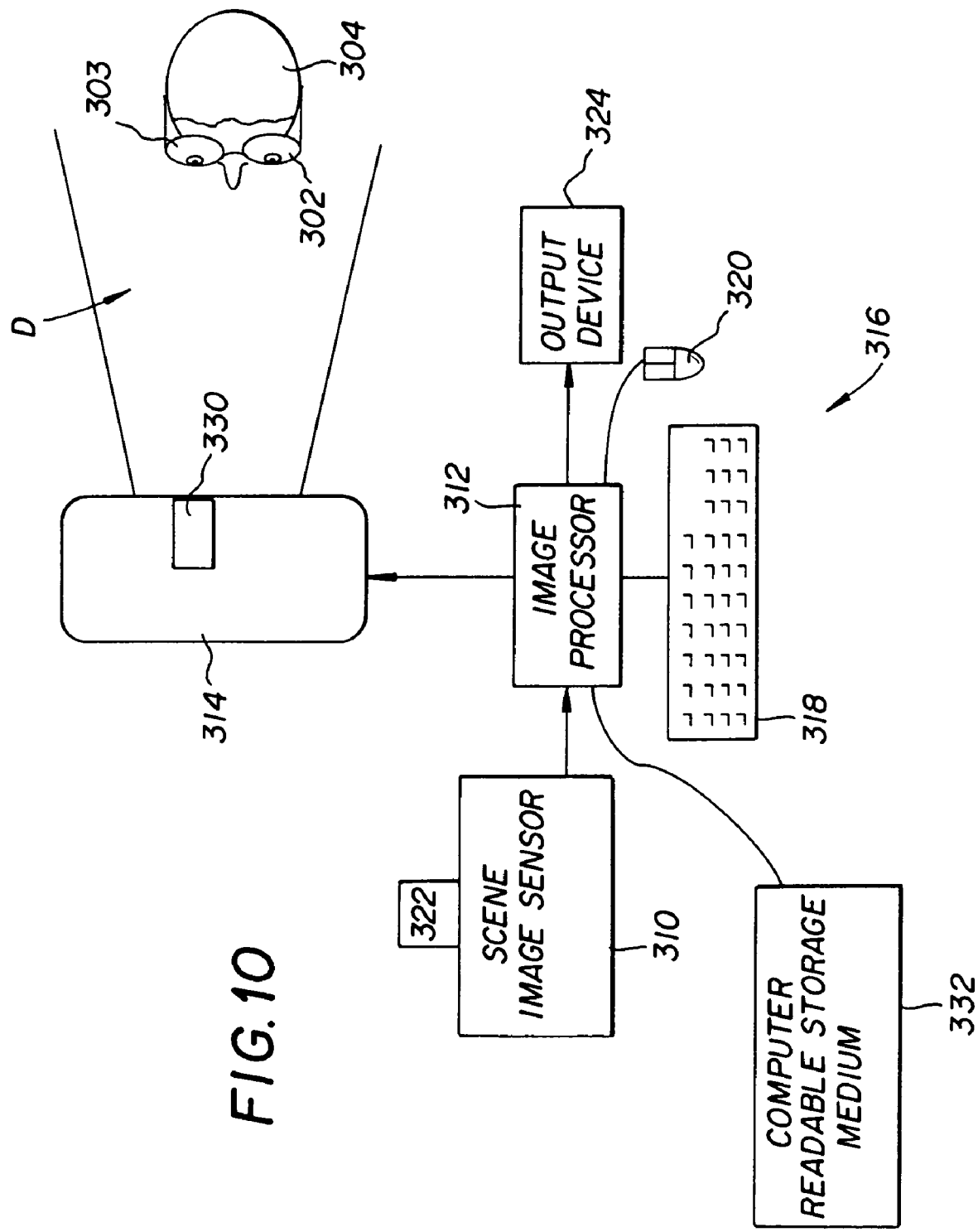
FIG. 10 shows another embodiment of an image processing system.

FIG. 10 shows another embodiment of an image processing system 300 useful in practicing the present invention including a scene image sensor 310 adapted to receive light from a scene and to convert this light into an image signal. The image from scene image sensor 310 is provided to an image processor 312, such as a programmable personal computer, or digital image processing work station such as a Sun Sparc workstation. Image processor 312 is connected to a display 314. Display 314 can comprise a cathode ray tube, an organic light emitting display (OLED), or other form of video display and presents evaluation images for viewing within a display space D. An operator interface 316 is provided and can comprise a conventional keyboard 318 and a mouse 320. Operator interface 316 can also be adapted to receive other forms of input such as voice instructions using voice recognition software.

In the embodiment shown, scene image sensor 310 is adjustable to permit user 4 to adjust the field of view and change the composition of the image to be captured. In this regard, image sensor adjustment actuators 322 are provided for mechanically adjusting the field of view in response to user inputs entered by way of operator interface 316. In this embodiment, changes to the field of view of scene image sensor 310 can be determined by monitoring inputs to image processor 312.

As is shown in FIG. 10, an eye monitoring system 330 is provided. In this embodiment, eye monitoring system 330 is adapted to scan display space D proximate to display 314 to identify an eye 2 of user 4 within display space D. During the image capture sequence, eye 2 is monitored as is described above and eye information is obtained and processed in the manner that is described above. In this embodiment, eye monitoring system 330 can be adapted to monitor eye 2 and eye 3 of observer 4 to obtain eye information from each eye. Comparison of the signals received from each eye can improve the accuracy of the eye information. Further, it will be appreciated that where an observer 4 does not hold his or her eyes proximate to the camera, it is likely that, at periods of time during the image capture sequence, the eye gaze direction of observer 4 will turn from viewing the scene on display 314 to direct observation of the scene. Eye monitoring system 70 can be adapted to map the eye gaze movement of eyes 2 and 3 of observer 4 relative to the scene when eyes 2 and 3 both when eyes 2 and 3 are directed at the scene directly or when displayed on display 314. Where this is done eye information obtained from eyes 2 and 3 can include information that characterizes the parallax differences between the eye gaze direction of eye 2 and eye 3. This parallax information can be used to automatically determine the focus distance and therefore can be used to assist in setting the focus settings of the image capture device.

When user 4 enters a signal, an archival image is composed and captured and optionally verified. Any eye information obtained during the image capture sequence is then associated with the archival image. Image processor 312 can also be adapted to capture context information during the image capture sequence. In one embodiment, image processor 312 is also connected to computer readable storage medium 332. Archival images, associated eye information and optional context information are processed for storage on computer readable storage medium 332 and stored thereon. Image processor 312 can also transmit processed digital images, eye information and optional context information to an output device 324. Output device 324 can comprise a hard copy printer, a longterm image storage device, a connection to another processor (not shown), or a telecommunication device connected, for example, to a telecommunications network such as the internet.

Figure 11:
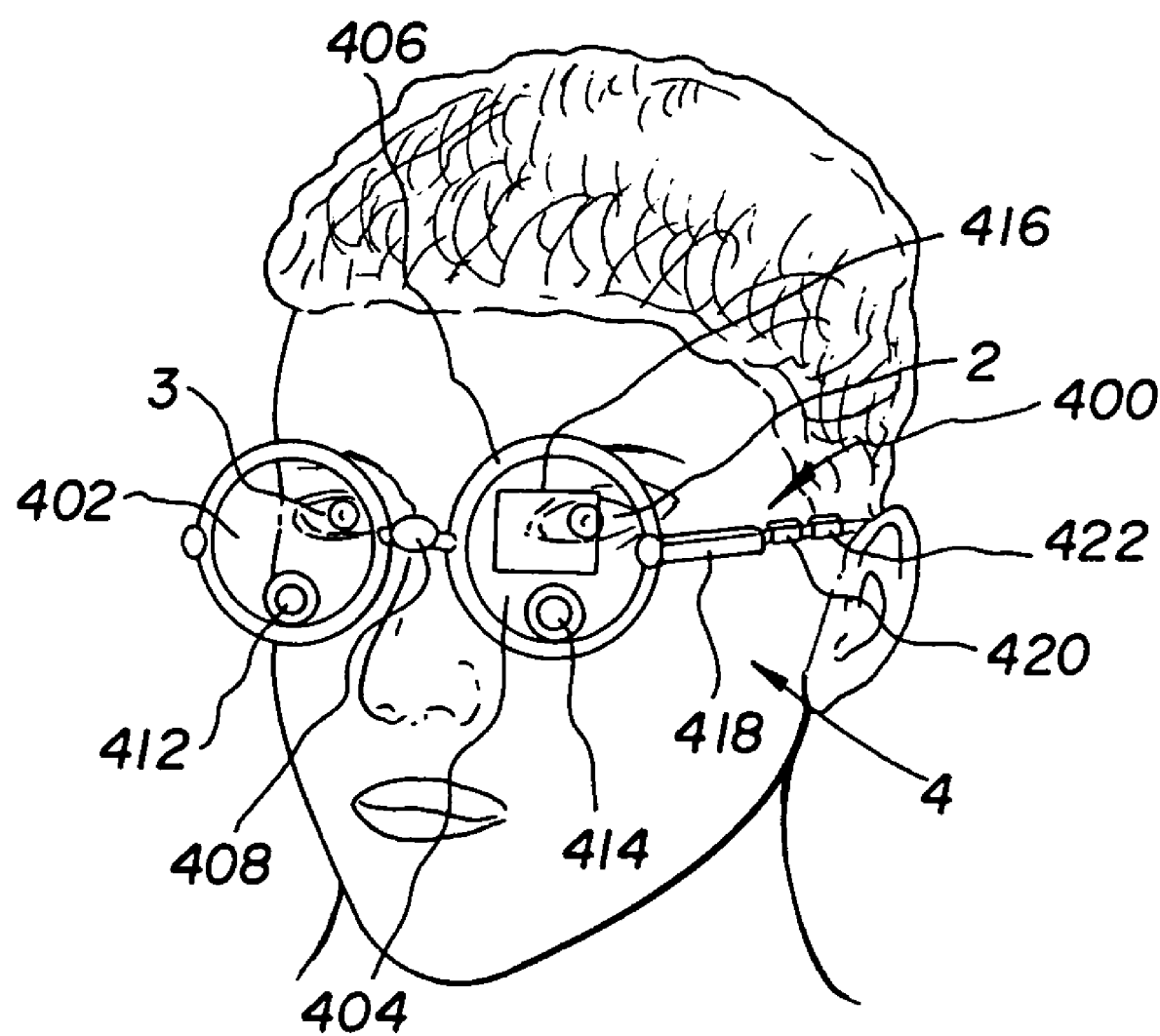
FIG. 11 shows a wearable embodiment of the present invention.

In FIG. 11 a wearable embodiment of a camera system 400 with eye monitoring is shown. In this embodiment, glass or plastic lenses 402 and 404 are supported by a conventional frame 406 having an image sensor 408 with an eye monitoring system 410. Eye monitoring system 410 can be adapted to monitor eye 2 and eye 3 of user 4 using eye imagers 412 and 414 respectively to obtain eye information. As discussed above, eye information can be obtained from one or both of eyes 2 or 3 of user 4. Comparison of the signals received from each eye can improve the accuracy of the eye information. For example, in this embodiment, user 4 observes a scene to be captured directly. In this embodiment, eye imagers 412 and 414 are adapted to map the eye gaze movement of eyes 2 and 3 of observer 4 relative to the scene. Eye information obtained from eyes 2 and 3 can include information that characterizes the parallax differences between the eye gaze direction of eye 2 and eye 3. This parallax information can be used to automatically determine the focus distance of an area that are of interest in the image and can therefore be used to assist in setting the focus settings of the wearable camera system 400.

In this embodiment, eye monitoring system 410 captures eye information during the image capture sequence and a scene imager 408 captures an archival image. One example of a wearable embodiment of an eye monitoring system 410 can be found in the above cited publication by Pelz et al. which describes a wearable light weight eye tracker in the form of headgear/goggles which includes a module containing an infrared illuminator, a miniature video eye camera, and a beam-splitter to align the camera to be coaxial with the illuminating beam. Retro-reflection provides the pupil illumination to produce a bright-pupil image. An external mirror folds the optical path toward the front of the headgear/goggles, where a hot mirror directs the IR illumination toward the eye and reflects the eye image back to the eye camera. A second miniature camera is mounted on the goggles to capture a scene image from the user's perspective. A display 416 can present evaluation images during the composition phase or verification phase of the image capture sequence. Alternatively, lenses 402 and 404 can contain a reticle to warn user 4 when the gaze of eyes 2 and 3 are outside a field of view of imager 408. A processor 418 in camera system 400 receives the scene image and eye information and optional context data and associates the archival scene image with the eye information in accordance with the methods described above. Processor 418 then stores the archival image with the eye information in memory 420 and/or transmits the archival image eye information and optional content information to a remote device using a communication module 422 such as a wired or wireless modem. During composition and verification phases of the image capture sequence, processor 418 can receive images from imager 408, convert these images into evaluation images and present the evaluation images using display 416.

In any embodiment described above, the camera system can comprise an input such as user controls 58 permitting user 4 to compose a scene in more than on composite steps separated by time. This allows, for example, eye information to be collected as a complex scene is assembled.

In various embodiments of the above described camera systems 20, image sensor 24 and video eye imager 80 can be separate from or separable from camera system 20 and can be adapted to communicate video information to camera system 20 by way of wired, wireless or other communication systems.

Methods for using eye information and optionally context information to determine an area of importance in an archival image will now be described. In the following description, methods will be described. However, in another embodiment, the methods described herein can take the form of a computer program product for determining an area of importance in an archival image in accordance with the methods described.

The computer program product for performing the described methods may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program product for performing the described methods may also be stored on a computer readable storage medium that is connected to the image processor by way of the internet or other communication medium. Those skilled in the art will readily recognize that the equivalent of such a computer program may also be constructed in hardware.

In describing the following methods, it should be apparent that the computer program product can be utilized by any well-known computer system, including but not limited to the computing systems incorporated in any of the camera systems described above including but not limited a personal computer of the type shown in FIG. 10. However, many other types of computer systems can be used to execute the computer program product. Consequently, the computer system will not be discussed in further detail herein.

It will be understood that the computer program product may make use of image manipulation algorithms and processes that are well known. Accordingly, the present description will be directed in particular to those algorithms and processes forming part of, or cooperating more directly with, the methods described. Thus, it will be understood that the computer program product may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or cooperating with the computer program product, are not specifically shown or described herein and may be selected from such algorithms, systems, hardware, components and elements known in the art.

Figure 12:
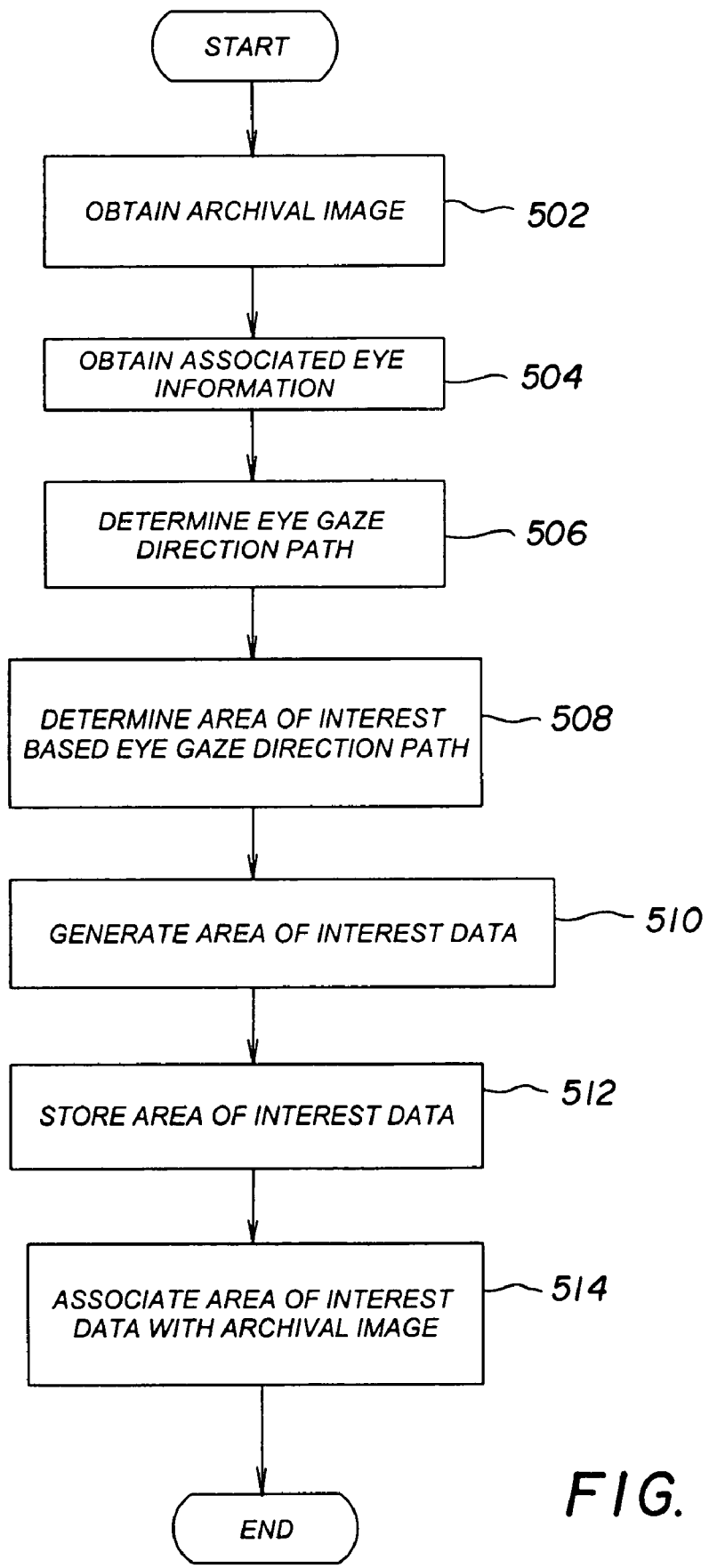
FIG. 12 shows an embodiment of a method for determining an area of importance in an image using eye information.
Figure 13:
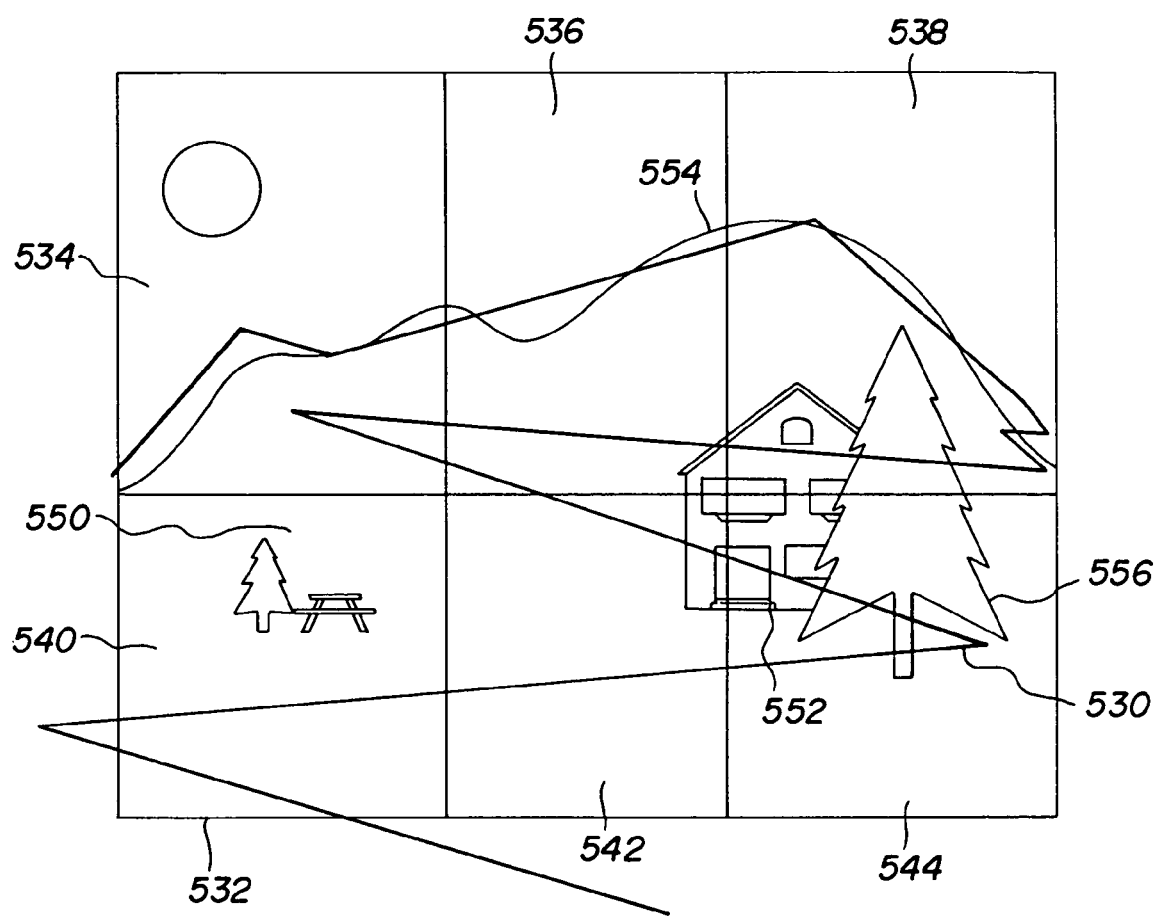
FIG. 13 shows an example of an archival image with an eye gaze direction path with various areas of the archival image designated.

FIG. 12 shows a first embodiment of a method for determining an area of importance in an image. In accordance with this method, an archival image is obtained (step 502) and associated eye information is obtained (step 504). The eye information contains eye gaze direction information. As is described in greater detail above, the eye gaze direction information describes eye gaze movement during the image capture sequence. From this information, an eye gaze direction path can be determined. In this embodiment, the eye gaze direction path is determined as a two-dimensional path that follows the movement of the eye of user 4 with respect to the archival image. One example of such an eye gaze direction path is shown in FIG. 13. In the example shown in FIG. 13, the eye gaze direction path 530 is shown as an overlay on archival image 532.

In accordance with the present invention, the eye gaze direction path 530 is used to determine a subject area for the archival image (step 506). There are various ways in which this can be done. In a simple embodiment, the archival image 32 can be separated into sections shown in FIG. 13 as areas 534, 536, 538, 540, 542 and 544. Each area is examined to determine the portion of the eye gaze direction path 530 that is contained within the area. As a shown in FIG. 13, area 540 contains a greater proportion of the eye gaze direction path 530 than any other area and, therefore, can be determined to be an area of high importance in the image. However, it will also be appreciated that other more complex analyses can be performed.

In an alternative embodiment, archival image 532 can be analyzed using image processing techniques such as image segmentation and segmented objects or regions in a picture, such as picnic area 550, house 552, mountain 554 and tree 556 can be identified as fiducials in the archival image. The eye gaze direction path can then be analyzed to determine, from the eye gaze direction path which of the fiducials in the image is important. For example, as a shown in FIG. 13, the eye gaze direction path follows features of a mountain 546 shown in FIG. 13. Accordingly, in this embodiment, the area of importance can be defined as the portion of archival image 532 containing mountain 554.

In still another alternative embodiment, patterns within the eye gaze path 530 can be identified which are indicative of areas of importance. For example, these patterns in area 534 of FIG. 13 may be indicative of an area of positive importance whereas areas of the image such as 536 and 542 which are only viewed briefly can be considered to be of lesser importance. Some patterns may suggest a negative importance. For example, in regions 538, the eye gaze travel path 530 repeatedly focuses at an edge of archival image 532. Such a pattern can be suggestive of an effort by a user 4 to compose the image so that not highly valued material at the edge of the archival image 530 is excluded. By identifying patterns of positive importance and patterns of negative importance, in the archival image, an area of importance can be determined.

Once an area of importance is determined, area importance data is generated which characterizes the portion of the archival image which comprises the area importance. (step 510). The area importance data is then stored (step 512) and associated (step 514) with the archival image. The steps of storage (step 512) association (step 514) can be reversed and the step of association can comprise storing the area importance data with the archival image, in the archival image, in data representing the archival image or in a separate data file with an indicator associating the archival image and the are of interest data. In another alternative embodiment the association can be made by an image processing algorithm that extracts the area of importance data and uses this data to process the archival image. For example, the area of importance data can be used to determine an area of importance for use by an automatic zoom and crop algorithm.

Figure 14:
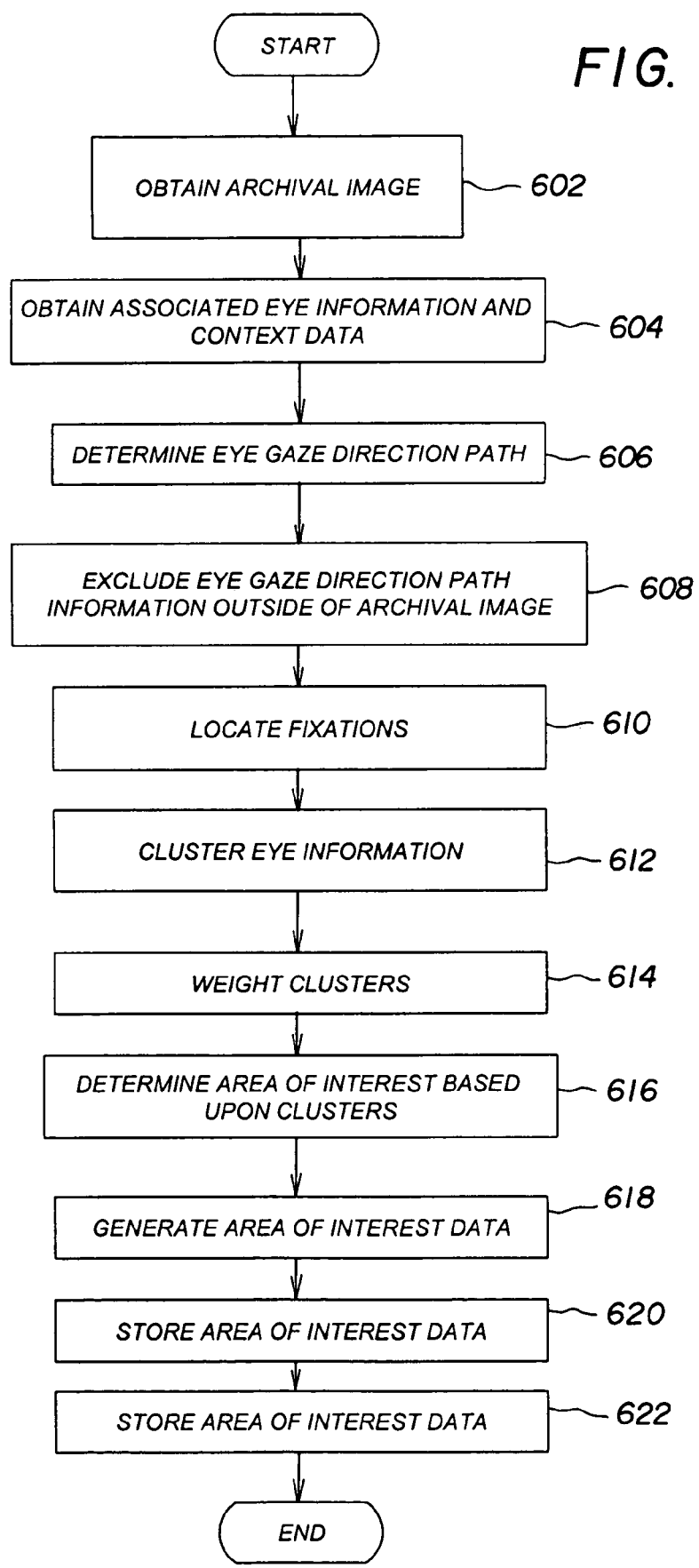
FIG. 14 shows an embodiment of a method for determining an area of importance in an archival image using eye information and context information.

FIG. 14 shows another embodiment a method for determining an area of importance in an archival image. In this embodiment, an archival image is obtained (step 602) and eye information and context information are obtained (step 604) in association with the obtained archival image. In this embodiment, the eye information includes eye gaze direction information obtained during the image capture sequence. Also in this embodiment, the context information contains camera adjustment information obtained during the image capture sequence.

An eye gaze direction path is determined (step 606). In this embodiment, the eye gaze direction path is determined relative to the archival image. To perform this step, the eye gaze direction information is adjusted based on the camera adjustment information so that to the extent that user to adjusts the composition by adjusting the field of view of the camera system, such adjustments are reflected in the eye gaze direction path information. In order to correlate these adjustments with the captured archival image, the eye gaze direction path is determined relative to the archival image. This can be done in a variety of ways. For example, corrections can be mathematically made to the eye gaze direction path in order to compensate for scene adjustments. Alternatively, the eye gaze direction can be mapped using a coordinate scale determined in part by the adjustment information.

In still another alternative embodiment, a composite image can be formed during an image capture sequence that contains image information from the sequence of evaluation images captured during image composition. The eye gaze direction information can be mapped into the composite image and the archival image can be registered with respect the composite image.

Figure 15:
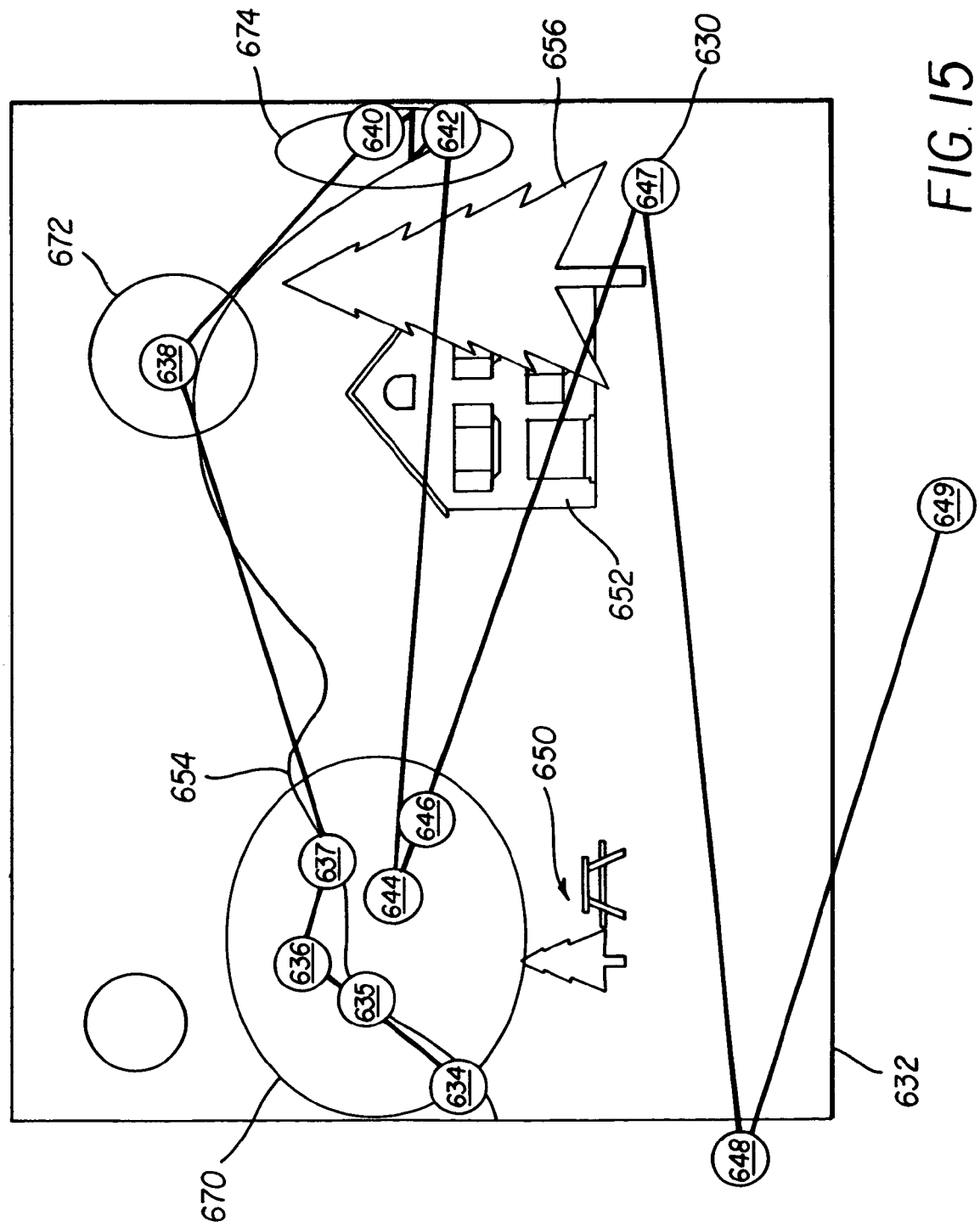
FIG. 15 shows an example of an archival image with an eye gaze direction path showing fixations and clusters therein.

It will be appreciated that, where significant changes have been made in the field of view during composition, portions of the eye gaze direction path determined during step 606 may be outside of the archival image. FIG. 15 shows a path of eye gaze travel 630 overlaid on an archival image 632 having a picnic area 650, a house 652, a mountain 654 and a tree 656 depicted therein. As is shown in FIG. 15, a portion of eye gaze direction path 630 is outside of the archival image. Where this occurs, the optional step of excluding eye gaze direction path information that is outside of the archival image from consideration can be used (step 608). This reduces the amount of information that must be considered when determining the area of importance.

In the embodiment shown in FIG. 14, yet another method for determining an area importance in an archival image based upon an eye gaze direction path is shown. In this embodiment, the eye gaze direction path is examined to determine fixations during eye movements. Generally speaking, eye gaze fixations occur when the gaze of the eye and of user 4 stays within a range of between ¼ to 2 degrees of the same position for a period of between 20 to 120 milliseconds (step 610). In the example shown in FIG. 15, a set of eye gaze fixations 634, 635, 636, 637, 638, 640, 642, 644, 646, 647, 648 and 649 are identified in this way. The eye gaze fixations are then clustered geographically using any number of mathematical clustering techniques (step 612). An example of this clustering is shown in FIG. 15 with three clusters 660, 662 and 664 identified.

Clusters 660, 662 and 664 are then weighted (step 614). The clusters can be weighted, for example, based upon which clustered contain fixations occur earliest in a sequence of fixations located in the eye gaze direction path. For example, the first fixation 634 detected in the eye gaze direction path can be assigned the highest weight with subsequent fixations each having a consecutively lower weight. The weighting can also be based upon the duration of each fixation. With longer fixation times having a higher weight. The weighting can also be based upon determinations of the pupil size during each fixation with larger pupil sizes having a higher weight. These weighting systems can also be used in conjunction. The pattern of the eye gaze direction path between clusters can also be used to help influence the weight assigned to each cluster. Some clusters may then be assigned weights based, at least in part, upon further contextual information that was collected near the time the eye fixations were made within a cluster. For example, pupil dilation changes, heart rate changes and other eye information can be used to change the weight applied to a cluster. Further, context information may be analyzed (not shown) to determine if the user attempted to exclude or include objects in clusters near the boundary of the archival image. For example, where the context information indicates that user 4 move camera system 20 to the left during fixations 642 and 644, a conclusion can be reached that user 4 intended to exclude this region. Accordingly, this conclusion can then be used to apply a negative weight to the cluster 664.

The area of importance can be determined based upon the weighted clusters. (step 616). For example, the area of importance can be determined to be area geographically related to a single cluster, or a group of clusters within the archival image having the highest weight. Area of importance data is then generated (step 618), stored (step 620), and associated with the archival image (step 622) as is generally described above.

In the embodiments of FIGS. 12 and 14, the step of determining an eye gaze direction path based upon the eye gaze direction information has been described (steps 506 and 606 respectively). It will be appreciated that these steps are optional and that eye gaze direction information can be directly analyzed to determine the features described therein without performing the step of determining an eye gaze direction path. In this regard, the eye gaze information can be analyzed in the form in which it is obtained to identify features such as concentration of gaze direction, eye gaze direction patterns, eye gaze fixations and clusters from which an area of importance in the archival image can be determined.

The invention has been described in detail with particular reference to certain preferred embodiments thereof, but it will be understood that variations and modifications can be effected within the spirit and scope of the invention.

Parts List 2 eye
3 eye
4 user
20 camera system
22 taking lens unit
24 image sensor
26 elements
28 elements
30 lens driver
31 optic beam splitter
32 viewfinder system
33 viewfinder display
34 analog signal processor
35 viewfinder optics
36 A/D converter
38 frame memory
39 display driver
40 digital signal processor
42 exterior display
44 data memory
46 host computer interface
48 rangefinder
50 camera microprocessor
52 memory card
54 memory card slot
56 memory card interface
68 user controls
60 shutter release
62 "wide" zoom lens button
64 "tele" zoom lens button
66 timing generator
68 sensor driver
70 eye monitoring system
76 scene adjustment sensors
78 additional image capture system
80 video eye imager
82 reticle
84 beam splitter
86 light source
100 image composition mode step
102 calibrate step
104 capture evaluation images
106 composition step
108 capture eye image step
110 capture archival image step
112 determine eye gaze data step
114 convert for storage step
116 associate with archival image
118 store archival image and eye gaze data step
120 enter image composition mode step
122 capture evaluation images step
124 compose scene step
126 capture eye image step
128 determine eye information step
130 determine context information step
132 capture archival image step
134 verify image step
136 track eye information during verification step
138 convert eye information for storage step
140 associate eye information context information with the archival image step
142 store eye information and archival image step
200 camera system
210 film image capture system
211 zoom lens system
212 lens system
214 film
220 electronic image capture system
230 viewfinder system
232 entry optical path
234 optical element
236 zoom optical element
238 beam splitter 240 capture path
242 optical element
244 image sensor
250 composition path
252 viewfinder optical elements
253 viewfinder optical elements
258 exterior display
260 eye monitoring system
262 video eye imager
264 light sources
300 image processing system
310 scene image sensor
312 image processor
314 display
316 operator interface
318 keyboard
320 mouse
322 storage
324 output device
326 output device
330 eye monitoring system
332 readable storage medium
400 camera system
402 lens
404 lens
406 frame
408 imager
410 eye monitoring system
412 eye imager
414 eye imager
416 display
418 processor
420 memory
422 communication module
502 obtain archival image step
504 obtain associated eye information step
506 determine eye gaze direction path step
508 determine area of importance based upon eye gaze direction path step
510 generate area of importance step
512 store area of importance step
514 associate area of importance data with archival image step
530 eye gaze direction path
532 archival image
534 area
536 area
538 area
540 area
542 area
544 area
550 picnic area
552 house
554 mountain
556 tree
602 obtain archival image step
604 obtain associated eye information context data step
606 determine eye gaze direction path step
608 exclude eye gaze direction path outside of archival image step
610 locate eye fixations in eye gaze direction path step
612 cluster fixations step
614 weight clusters step
616 determine area of importance based upon clusters step
618 generate area of importance data step
620 store area of importance data step
622 associate area of importance with image step
630 eye gaze direction path
632 archival image
634 fixation
635 fixation
636 fixation
637 fixation
638 fixation
640 fixation
642 fixation
644 fixation
646 fixation
647 fixation
648 fixation
649 fixation
650 picnic area
652 house
654 mountain
656 tree
660 cluster
662 cluster
664 cluster
A display space
B light from scene
C light from light sources
D display space

What is claimed is:

1. A camera system comprising:
an image capture system for capturing an archival image of a scene during an archival image capture sequence including a composition phase before an image capture phase during which the archival image is captured;
an eye monitoring system adapted to determine eye information from including a direction of the gaze of an eye of a user;
a source of context information; and
a controller adapted to use the eye monitoring system to determine eye information from which a path of eye gaze direction can be determined that represents a path of eye gaze direction during a range of different times during the archival image capture sequence; and to store the eye information and context information during the archival image capture sequence and to associate the stored information with the archival image captured during the archival image capture sequence;
wherein the controller causes the image capture system to capture a set of evaluation images during the composition phase of the archival image capture sequence and the source of context information comprises an image processor adapted to determine image information characterizing changes in the composition of the scene during the composition phase based on image analysis of the set of evaluation images and wherein the controller causes the image capture system to capture a set of evaluation images during the archival image capture sequence; and,
wherein said image processor adapted to determine information characterizing changes in the field of view of the archival image capture system by assembling a composite image mapping all portions of the scene imaged by any of the set of captured evaluation images and said processor records eye gaze information in relation to the assembled composite.

2. The camera system of claim 1, wherein the eye information determined by the eye monitoring system further includes information characterizing changes in the diameter of the pupil during the image capture sequence.

3. The camera system of claim 1, wherein the eye information determined by the eye monitoring system further includes information characterizing eye temperature during the image capture sequence.

4. The camera system of claim 1, wherein the controller determines eye information further includes data from which the amount of dwell time at each location, or the acceleration of eye gaze position during movement can be determined.

5. The camera system of claim 1, wherein the eye information determined by the eye monitoring system further includes eye information from both eyes of the user.

6. The camera system of claim 5, wherein the controller is further adapted to determine focus distance information during the image capture sequence based upon parallax differences between the eye gaze direction of both eyes of observer.

7. The camera system of claim 5, wherein the controller is further adapted to compare eye gaze direction information determined from monitoring of both eyes of the observer for validation.

8. The camera system of claim 1, further comprising an input transducer adapted to generate signals in response to manual input from a user of the camera system and wherein said controller is adapted to store input transducer information during the image capture sequence and to associate the input transducer information with the scene image.

9. The camera system of claim 1, wherein the image capture system is a digital image capture system operable to form evaluation images during image composition and further comprising a display to present the evaluation images.

10. The camera system of claim 1, further comprising an additional image capture system adapted to store scene images on a photosensitive medium and having a write head to optically record the stored eye information on the photosensitive medium.

11. The camera system of claim 1, wherein the controller stores the eye information apart from the scene image and the controller associates the scene image with the eye information by recording data with the scene image which can be used to locate the eye information.

12. The camera system of claim 1, wherein the source of context information comprises a location detector adapted to determine where the archival image was captured.

13. The camera system of claim 1, wherein the controller causes the image capture system to capture a set of evaluation images during a composition phase of the archival image capture sequence and the source of context information comprises an image processor adapted to determine image information characterizing changes in the composition of the scene during the composition phase based on image analysis of the set of evaluation images.

14. The camera system of claim 1, wherein the controller causes the image capture system to capture a set of evaluation images during a composition phase of the archival image capture sequence and the source of context information comprises an image processor adapted to determine image information characterizing changes in the composition of the scene during the composition phase based on image analysis of the set of evaluation images to locate fiducials in the image.

15. The camera system of claim 1, wherein said controller comprises said source of context information and said controller is adapted to cause the image capture system to capture evaluation images during the image capture sequence and to store the captured evaluation images in association with the captured archival image with said evaluation images being captured at different times than said archival image.

16. The camera system of claim 1, wherein the source of context information comprises a manual input and the controller monitors the manual input during the image capture sequence and associates information characterizing changes in the status of the manual input during the image capture process with the captured archival image.

17. The camera system of claim 16, wherein the image capture system comprises a taking lens unit having an adjustable zoom setting and the manual input comprises a zoom setting input.

18. The camera system of claim 16, wherein the image capture system comprises a taking lens unit having an adjustable zoom setting and the manual input comprises a zoom setting input with the controller adjusting the eye gaze information based upon the zoom setting input.

19. The camera system of claim 1, wherein the source of context data comprises a scene brightness detector.

20. The camera system of claim 1, wherein the image capture system captures the archival image in the form of a digital archival image signal and the controller stores the electronic archival image signal in association with the eye movement data signal and the context information in digital form.

21. The camera system of claim 1, further comprising an archival image capture system that captures the archival image on a photosensitive element and further comprising a recording head for optically recording the eye information and context information on the photosensitive element.

22. The camera system of claim 1, further comprising an archival capture system that captures images on a photosensitive element and the archival image capture system comprises a film data recorder for recording the eye information and context information onto the film.

23. The camera system of claim 1, wherein the eye monitoring system comprises an optical system that presents light from the scene to form an image of the scene at an eye of an observer and an eye camera that captures images of the eye during the image capture sequence.

24. The camera system of claim 23, wherein a beam splitter is disposed in the optical path between the scene and the eye of the observer, with the beam splitter adapted to deflect an image of the eye to the eye camera.

25. The camera system of claim 23, wherein the eye monitoring system further comprises an image processor to examine the eye images and to determine eye gaze direction.

26. The camera of claim 23, wherein the eye monitoring system comprises an eye camera that further detects pupil dilation and wherein the controller is further adapted to incorporate pupil dilation information in the eye information.

27. The camera system of claim 1, wherein said processor is further adapted to perform an evaluation image capture sequence during composition and wherein an evaluation image display is adapted to present captured evaluation images to a display space for observation by a user and wherein the user can observe the scene either directly or through the display, an eye imager capturing images of the display space and wherein said controller is further adapted to receive images from the eye imager and to map the eye gaze direction of an eye of the user relative to the scene both when the eye in the display space is directed at the scene directly or at the scene as displayed on the display in order to determine eye information characterizing eye gaze direction of the eye.

28. The camera system of claim 27, further comprising a beam splitter interposed between the display and the eye with the beam splitter reflecting light from the eye onto the eye imager.

29. The camera system of claim 1, wherein the camera system is incorporated into a set of glasses.

30. A method for operating a camera system comprising the steps of:
- capturing an archival image of a scene during an archival image capture sequence including a composition phase before an image capture phase during which the archival image is captured;
- obtaining context information;
- determining eye information including a direction of the gaze of an eye of a user from which a path of eye gaze direction can be determined that represents a path of eye gaze direction during a range of different times during the archival image capture sequence;
- storing the eye information and context information during the archival image capture sequence; and
- associating the stored eye information and context information with the archival image captured during the archival image capture sequence;
- wherein a set of evaluation images is captured during the composition phase of the archival image capture sequence and the step of obtaining context information comprises determining image information characterizing changes in the composition of the scene during the composition phase based on image analysis of the set of evaluation images and,
- wherein the image information characterizing changes in the field of view of the archival image capture system is determined by assembling a composite image mapping all portions of the scene imaged by any of the set of captured evaluation images and the eye gaze information is mapped in relation to the assembled composite.

31. The method of claim 30, further comprising the step of storing the eye gaze information with the archival image in a memory outside of the camera.

32. The method of claim 30, wherein the step of monitoring eye information includes monitoring a diameter of a pupil of the eye, and
- wherein the step of determining eye information includes determining a pattern of changes in pupil diameter during the composition phase and the image capture phase.

33. The method of claim 30, further comprising the steps of forming an evaluation image corresponding to the captured archival image and presenting the evaluation image to the user of the camera system;
- monitoring eye information including eye gaze information during presentation of the evaluation image; and
- determining further eye information representing a pattern of changes in eye gaze direction during presentation of the evaluation image over a time period after capture of the archival image and wherein the evaluation image is presented.

34. The method of claim 30, wherein the camera system has a user interface adapted to receive user inputs and the step of determining context information comprises monitoring changes in the user inputs.

35. A method for operating a camera system comprising the steps of:
- means for capturing an archival image of a scene during an archival image capture sequence including a composition phase before an image capture phase during which the archival image is captured;
- means for using an eye monitoring system to determine eye information including a direction of the gaze of an eye of a user from which a path of eye gaze direction can be determined that represents a path of eye gaze direction during a range of different times during the archival image capture sequence;
- means for obtaining context information;
- means for storing the eye information and context information during the archival image capture sequence; and
- means for associating the stored eye information and context information with the archival image captured during the archival image capture sequence;
- wherein a set of evaluation images is captured during the composition phase of the archival image capture sequence and the step of obtaining context information comprises determining image information characterizing changes in the composition of the scene during the composition phase based on image analysis of the set of evaluation images and,
- wherein the image information characterizing changes in the field of view of the archival image capture system is determined by assembling a composite image mapping all portions of the scene imaged by any of the set of captured evaluation images and the eye gaze information is mapped in relation to the assembled composite.

* * * * *

UNITED STATES PATENT AND TRADEMARK OFFICE
CERTIFICATE OF CORRECTION

PATENT NO. : 7,206,022 B2 Page 1 of 1
APPLICATION NO. : 10/303978
DATED : April 17, 2007
INVENTOR(S) : Michael E. Miller et al.

It is certified that error appears in the above-identified patent and that said Letters Patent is hereby corrected as shown below:

In Claim 26, after "camera" insert --system--.

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,206,022 B2  Page 1 of 1
APPLICATION NO. : 10/303978
DATED : April 17, 2007
INVENTOR(S) : Michael E. Miller et al.

It is certified that error appears in the above-identified patent and that said Letters Patent is hereby corrected as shown below:

Column 28, Claim 26, line 49, after "camera" insert --system--.

This certificate supersedes the Certificate of Correction issued May 6, 2008.

Signed and Sealed this

Third Day of June, 2008

JON W. DUDAS
*Director of the United States Patent and Trademark Office*